US010824951B2

(12) United States Patent
Yan et al.

(10) Patent No.: US 10,824,951 B2
(45) Date of Patent: Nov. 3, 2020

(54) SYSTEM AND METHOD FOR RULE GENERATION USING DATA PROCESSED BY A BINARY CLASSIFIER

(71) Applicants: Rui Yan, Oakville (CA); Shutao Yuan, Aurora (CA)

(72) Inventors: Rui Yan, Oakville (CA); Shutao Yuan, Aurora (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 815 days.

(21) Appl. No.: 15/069,247

(22) Filed: Mar. 14, 2016

(65) Prior Publication Data
US 2017/0262761 A1    Sep. 14, 2017

(51) Int. Cl.
| G06N 5/04 | (2006.01) |
| G06N 20/00 | (2019.01) |
| G06N 5/02 | (2006.01) |
| G06N 7/00 | (2006.01) |

(52) U.S. Cl.
CPC ............. *G06N 5/046* (2013.01); *G06N 5/025* (2013.01); *G06N 5/045* (2013.01); *G06N 7/005* (2013.01); *G06N 20/00* (2019.01)

(58) Field of Classification Search
CPC ........ G06N 5/046; G06N 5/045; G06N 5/025; G06N 7/005; G06N 99/005; G06N 20/00
USPC .......................................................... 706/12
See application file for complete search history.

(56) References Cited

U.S. PATENT DOCUMENTS

| 6,523,020 B1 | 2/2003 | Weiss | |
| 7,194,380 B2 * | 3/2007 | Barrow | G06K 9/6298 702/181 |
| 7,966,256 B2 * | 6/2011 | Liao | G06Q 20/10 705/35 |
| 8,121,939 B2 * | 2/2012 | Banasiak | G06Q 10/04 705/38 |
| 8,489,499 B2 * | 7/2013 | Yan | G06Q 10/067 705/38 |

(Continued)

FOREIGN PATENT DOCUMENTS

| CN | 101449264 A | 6/2009 |
| WO | 9847067 A1 | 10/1998 |
| WO | 2008104742 A2 | 9/2008 |

OTHER PUBLICATIONS

Baesens, Bart "Developing Intelligent Systems for Credit Scoring Using Machine Learning Techniques" 2003 Katholieke Universiteit Leuven. (Year: 2003).*

(Continued)

*Primary Examiner* — Miranda M Huang
*Assistant Examiner* — Chase P. Hinckley

(57) ABSTRACT

A computer-implemented method is disclosed that operates in conjunction with machine learning binary classification of an event. The method generates a rule relating to whether or not the event will occur. In one embodiment, the method includes obtaining foreground sequences corresponding to the event happening and background sequences corresponding to the event not happening. For each foreground sequence of a number of foreground sequences, the computer computes a plurality of difference values. The rule may be determined based on a largest difference value for one of the plurality of foreground sequences. A corresponding system is also disclosed.

15 Claims, 11 Drawing Sheets

(56) References Cited

U.S. PATENT DOCUMENTS

| | | | | |
|---|---|---|---|---|
| 2003/0004902 | A1* | 1/2003 | Yamanishi | G06N 5/025 706/1 |
| 2005/0235356 | A1* | 10/2005 | Wang | G06F 16/2477 726/22 |
| 2007/0260568 | A1 | 11/2007 | Perng et al. | |
| 2008/0069437 | A1* | 3/2008 | Baker | G06K 9/6256 382/159 |
| 2008/0101689 | A1* | 5/2008 | Forman | G06K 9/623 382/159 |
| 2010/0017359 | A1* | 1/2010 | Kiernan | G06Q 10/10 706/58 |
| 2011/0044499 | A1* | 2/2011 | Cobb | G06K 9/00771 382/103 |
| 2012/0296806 | A1* | 11/2012 | Abrahams | G06Q 40/08 705/38 |
| 2013/0325773 | A1* | 12/2013 | Sinyavskiy | G05B 13/027 706/23 |
| 2014/0201225 | A1* | 7/2014 | Deshmukh | G06F 16/20 707/758 |
| 2015/0142718 | A1* | 5/2015 | Bostick | G06N 5/025 706/47 |
| 2015/0242762 | A1 | 8/2015 | Cox et al. | |
| 2016/0155069 | A1* | 6/2016 | Hoover | G06Q 30/06 706/12 |
| 2016/0232455 | A1* | 8/2016 | Carus | G06N 7/005 |
| 2017/0344591 | A1* | 11/2017 | Baum | G06F 16/2272 |
| 2018/0365375 | A1* | 12/2018 | Flygare | G16B 40/00 |

OTHER PUBLICATIONS

Zhou et al., "Pattern Based Sequence Classification", Dec. 17, 2015 IEEE Transactions on Knowledge and Data Engineering, pp. 1-14. (Year: 2015).*

Baesens, Bart "Developing Intelligent Systems for Credit Scoring Using Machine Learning Techniques" 2003, pp. 1-242. (Year: 2003).*

Sezgin, Ozge "Statistical Methods in Credit Ranking" Sep. 2006 Middle East Technical University, pp. 1-110. (Year: 2006).*

Suntinger, Martin "Event-Based Similarity Search and its Applications in Business Analytics" Mar. 23, 2009 TU Wien University of Technology, pp. 1-144. (Year: 2009).*

Novak et al., "Supervised Descriptive Rule Discovery: A Unifying Survey of Contrast Set, Emerging Pattern, and Subgroup Mining" Feb. 2009, Journal of Machine Learning Research, pp. 377-403. (Year: 2009).*

Zhang et al., "Occupancy-Based Frequent Pattern Mining" Oct. 2015, ACM Transactions on Knowledge Discovery from Data, vol. 10, No. 2, Article 14, pp. 1-33. (Year: 2015).*

Low-Kam et al., "Mining Statistically Significant Sequential Patterns" Dec. 7-10, 2013 IEEE 13th International Conference on Data Mining, pp. 488-497. (Year: 2013).*

Eslahchi et al., "LIBRA: A de Novo Motif Finding in Promoter Sequences Based on Linear Algebra" 2009 World Academy of Science, Engineering, and Technology, pp. 506-512 (Year: 2009).*

Farhadieh et al., "A Statistical Framework for Quantifying Adaptive Behavioural Risk for the Banking Industry" 2011 Swinburne University of Technology, pp. i-262. (Year: 2011).*

Chan et al., "A text-based decision support system for financial sequence prediction" Jul. 23, 2011 Decision Support Systems 52, pp. 189-198. (Year: 2011).*

Chandola et al., "Anomaly Detection for Discrete Sequence: A Survey" May 2012 IEEE Transactions on Knowledge and Data Engineering, vol. 24, No. 5, pp. 823-839. (Year: 2012).*

Gwadera et al., "Reliable Detection of Episodes in Event Sequences" 2003 IEEE Proceedings of the Third IEEE International Conference on Data Mining. (Year: 2003).*

Liu et al., "Toward Integrating Feature Selection Algorithms for Classification and Clustering" Apr. 2005 IEEE Transactions on Knowledge and Data Engineering, vol. 17, No. 4, pp. 491-502. (Year: 2005).*

Nakamura et al., "Frequent Approximate Substring Pattern Mining Using Locally Optimal Occurrence Counting" 2012 IIAI International Conference on Advanced Applied Informatics, pp. 54-59. (Year: 2012).*

Muzammal et al., "Mining Sequential Patterns from Probabilistic Data" Sep. 2012 University of Leicester, pp. i-188. (Year: 2012).*

Bringmann et al., "Pattern-Based Classification: A Unifying Perspective" Nov. 26, 2011, Catholic University Leuven. (Year: 2011).*

Kadir et al., "Enhancing Classification Accuracy with Frequent Positive and Negative Rules" Aug. 20, 2014, Journal of Theoretical and Applied Information Technology, vol. 66, No. 2, pp. 699-713. (Year: 2014).*

Dewang et al., "A New Method for Generating All Positive and Negative Association Rules" Apr. 2011, International Journal on Computer Science and Engineering, vol. 3, No. 4, pp. 1649-1657. (Year: 2011).*

Li et al., "Associative Classification with Statistically Significant Positive and Negative Rules" Oct. 19-23, 2015, pp. 633-642. (Year : 2015).*

Ruggieri et al., "Data Mining for Discrimination Discovery" May 2010, ACM Transactions on Knowledge Discovery from Data, vol. 4, No. 2, Article 9, pp. 1-40. (Year: 2010).*

Sarno et al., "Hybrid Association Rule Learning and Process Mining for Fraud Detection" Apr. 24, 2015, IAENG International Journal of Computer Science. (Year: 2015).*

Zhao et al., "Debt Detection in Social Security by Sequence Classification Using Both Positive and Negative Patterns" 2009, pp. 648-663. (Year: 2009).*

Kavsek et al., "APRIORI-SD: Adapting Association Rule Learning to Subgroup Discovery" Nov. 5, 2007, Applied Artificial Intelligence, 20, pp. 543-583. (Year: 2007).*

Klein et al., "Searching for a set of correlated patterns" 2007, Journal of Discrete Algorithms, pp. 149-161. (Year: 2007).*

Yu et al., "Mining Emerging Patterns by Streaming Feature Selection" Aug. 12-16, 2012, pp. 60-68. (Year: 2012).*

Yu et al., "Classification with Streaming Features: An Emerging-Pattern Mining Approach" Jun. 2015, ACM Transactions on Knowledge Discovery from Data, vol. 9, No. 4, Article 30, pp. 1-31. (Year: 2015).*

Dojchinovski et al., "Personalised Access to Linked Data" 2014, pp. 121-136, article in Janowicz et al., (Eds.) "Knowledge Engineering and Knowledge Management", 19th Internatioal Conference EKAW 2014. (Year: 2014).*

Foo, Norman (Ed.), "Advanced Topics in Artificial Intelligence" Dec. 1999, pp. i-502. (Year: 1999).*

Kim, Taejin, "Essays in Financial Intermediation" Aug. 2013, Doctoral Dissertation, Northwestern University, pp. i-218. (Year: 2013).*

Bologna, G. "A model for single and multiple knowledge based networks", Artificial Intelligence in Medicine 28, (2003), pp. 141-163.

Zhou, Zhi-Hua, et al. "Extracting Symbolic Rules from Trained Neural Network Ensembles", AI Communications, 1.61 (2003): pp. 3-15.

Stefanowski, Jerzy "On rough set based approaches to induction of decision rules." Rough sets in knowledge discovery 1.1 (1998): pp. 500-529.

Hayashi, Yoichi, et al. "A New approach to Three Ensemble neural network rule extraction using Recursive-Rule aXtraction algorithm." Neural Networks (IJCNN), The 2013 International Joint Conference on. IEEE, 2013.

Parpinelli, Rafael, et al. "Data mining with an ant colony optimization algorithm." Evolutionary Computation, IEEE Transactions on. 6.4 (2002): pp. 321-332.

Jaganathan, P., et al. "Classification Rule Discovery with Ant Colony Optimization and Improved Quick Reduct Algorithm", IAENG International Journal of Computer Science, Feb. 13, 2007, 33:1, IJCS_33_1_9, pp. 1-6.

Bae, Jae Kwon, et al. "A Personal Credit Rating Prediction Model Using Data Mining in Smart Ubiquitous Environments", International Journal of Distributed Sensor Networks, 2015, vol. 2015, 6 pages, http://dx.doi.org/10.1155/2015/179060.

(56) References Cited

OTHER PUBLICATIONS

Liu, Bo, et al. "Classification Rule Discovery with Ant Colony Optimization", IEEE Computational Intelligence Bulletin, Feb. 2004, vol.3, No. 1, pp. 1-5.
Parpinelli, Rafael S., et al. "Data Mining With an Ant Colony Optimization Algorithm" IEEE Transactions on Evolutionary Computing, Aug. 2002, vol. 6, No. 4, pp. 321-332.
Grzymala-Busse, Jerzy, et al. "A Comparison of Two Approaches to Data Mining from Imbalanced Data", KES, 2004, LNAI 3213, pp. 757-763.
Nauck, Detlef D. "Fuzzy data analysis with NEFCLASS", International Journal of Approximate Reasoning 32, (2003), pp. 103-130.
Conde, Guilherme A., et al., "Neuro-Fuzzy Networks for Pattern Classification and Rule Extraction", Proceedings of the Sixth Brazilian Symposium on Neural Networks, (SBRN'00), IEEE, 2000, p. 1.
Lu, Hongjun, et al. "NeuroRule: A Connectionist Approach to Data Mining", Proceedings of the 21st VLDB Conference, Zürich, Switzerland, 1995, pp. 478-489.
Baesens, Bart "Developing Intelligent Systems for Credit Scoring Using Machine Learning Techniques", 2003, pp. 1-264.
Craven, Mark "Rule extraction: Where do we go from here." University of Wisconsin Machine Learning Research Group working Paper (1999): 99-1, pp. 1-6.
Nimmycleetus, Dhanya et al. "Rule Induction using Ant-Miner Algorithm", International Journal of Scientific & Engineering Research, Feb. 2014, vol. 5, Issue 2, pp. 6-11.
Tam, Kar Yan, et al. "Managerial Applications of Neural Networks: The Case of Bank Failure Predictions", Management Science, 1992, 38(7):926-947. http://dx.doi.org/10.1287/mnsc.38.7.926.
Frank, Eibe, et al. "Generating Accurate Rule Sets Without Global Optimization", Working Paper Series, Jan. 1998, pp. 1-16.
Bologna, Guido, "A Study on Rule Extraction from Neural Networks Applied to Medical Databases." The 4th European Conference on Principles and Practice of Knowledge Discovery (PKDD2000), Lyon, France, 2000, pp. 1-11.
D T Pham et al. RULES-5: a rule induction algorithm for Classification Problems involving continuous attributes, Jroceedings of the Institution of Mechanical Engineers, Part C: Journal of Mechanical Engineering Science, vol. 217, No. 12, 2003, pp. 1273-1286. XP055520750.
Marco Tulio Ribeiro et al. "Why Should I Trust You?" Explaining the Predictions of Any Classifier, Feb. 16, 2016. total 15 pages. XP080683877.
XP055649749, S.M. Monzurur Rahman et al.,"Rules mining from multi-layered neural networks", International Journal of Computational Systems Engineering, 2012 vol. 1 No. 1, total 13 pages.

\* cited by examiner

|  | Feature V | Feature W | Feature X | Feature Y | Feature Z | Event Occured? |
|---|---|---|---|---|---|---|
| Sample 1 | $v_1$ | $w_1$ | $x_1$ | $y_1$ | $z_1$ | YES |
| Sample 2 | $v_2$ | $w_2$ | $x_2$ | $y_2$ | $z_2$ | YES |
| Sample 3 | $v_3$ | $w_3$ | $x_3$ | $y_3$ | $z_3$ | NO |
| Sample 4 | $v_4$ | $w_4$ | $x_4$ | $y_4$ | $z_4$ | NO |
| Sample 5 | $v_5$ | $w_5$ | $x_5$ | $y_5$ | $z_5$ | NO |
| Sample 6 | $v_6$ | $w_6$ | $x_6$ | $y_6$ | $z_6$ | NO |
| Sample 7 | $v_7$ | $w_7$ | $x_7$ | $y_7$ | $z_7$ | YES |
| Sample 8 | $v_8$ | $w_8$ | $x_8$ | $y_8$ | $z_8$ | YES |
| Sample 9 | $v_9$ | $w_9$ | $x_9$ | $y_9$ | $z_9$ | NO |
| Sample 10 | $v_{10}$ | $w_{10}$ | $x_{10}$ | $y_{10}$ | $z_{10}$ | YES |

FIG. 2

|  | V<br>(Loan<br>Amount)<br>[$] | W<br>(Loan<br>Duration)<br>[Months] | X<br>(Monthly<br>Salary)<br>[$] | Y<br>(Monthly<br>Spending)<br>[$] | Z<br>(Credit<br>Rating)<br>[1 to 10] | LD?<br>(Loan<br>Default<br>Occured?) |
|---|---|---|---|---|---|---|
| Sample 1 | 500 | 3 | 500 | 1200 | 2 | YES |
| Sample 2 | 750 | 1 | 700 | 3500 | 4 | YES |
| Sample 3 | 200 | 5 | 2000 | 500 | 1 | NO |
| Sample 4 | 6000 | 10 | 250 | 1500 | 5 | NO |
| Sample 5 | 30000 | 48 | 5000 | 4000 | 7 | NO |
| Sample 6 | 60000 | 120 | 11000 | 10500 | 10 | NO |
| Sample 7 | 500 | 4 | 100 | 11000 | 8 | YES |
| Sample 8 | 4500 | 54 | 12000 | 12500 | 2 | YES |
| Sample 9 | 400 | 3 | 7000 | 1200 | 5 | NO |
| Sample 10 | 900 | 3 | 800 | 1100 | 4 | YES |

FIG. 3

| Feature V - LOAN AMOUNT ($) |
|---|
| IF Loan Amount < $1000 THEN Categorized Feature Value A |
| IF $1000 ≤ Loan Amount < $10,000 THEN Categorized Feature Value B |
| IF $10,000 ≤ Loan Amount < $50,000 THEN Categorized Feature Value C |
| IF Loan Amount ≥ $50,000 THEN Categorized Feature Value D |

| Feature W - LOAN DURATION (Months) |
|---|
| IF Loan Duration < 6 months THEN Categorized Feature Value A |
| IF 6 months ≤ Loan Duration < 36 months THEN Categorized Feature Value B |
| IF 36 months ≤ Loan Duration < 60 months THEN Categorized Feature Value C |
| IF Loan Duration ≥ 60 months THEN Categorized Feature Value D |

| Feature X - MONTHLY SALARY ($) |
|---|
| IF Monthly Salary < $1000 THEN Categorized Feature Value A |
| IF $1000 ≤ Monthly Salary < $3000 THEN Categorized Feature Value B |
| IF $3000 ≤ Monthly Salary < $10,000 THEN Categorized Feature Value C |
| IF Monthly Salary ≥ $10,000 THEN Categorized Feature Value D |

| Feature Y - AVERAGE MONTHLY SPENDING ($) |
|---|
| IF Monthly Spending < $1000 THEN Categorized Feature Value A |
| IF $1000 ≤ Monthly Spending < $3000 THEN Categorized Feature Value B |
| IF $3000 ≤ Monthly Spending < $10,000 THEN Categorized Feature Value C |
| IF Monthly Spending ≥ $10,000 THEN Categorized Feature Value D |

| Feature Z - CREDIT RATING (1=POOR, 10=EXCELLENT) |
|---|
| IF Credit Rating < 3 THEN Categorized Feature Value A |
| IF 3 ≤ Credit Rating < 6 THEN Categorized Feature Value B |
| IF 6 ≤ Credit Rating < 8 THEN Categorized Feature Value C |
| IF 8 ≤ Credit Rating ≤ 10 THEN Categorized Feature Value D |

| BG | 1 | 2 | 3 | 4 | 5 |
|---|---|---|---|---|---|
| 1 | A | A | A | A | B |
| 2 | B | B | B | B | A |
| 3 | C | C | C | C | C |
| 4 | D | D | D | D | D |
| 5 | B | B | A | A | C |

⇒

| Prob | 1 | 2 | 3 | 4 | 5 |
|---|---|---|---|---|---|
| A | 3/14 | 3/14 | 5/14 | 5/14 | 3/14 |
| B | 5/14 | 5/14 | 3/14 | 3/14 | 3/14 |
| C | 3/14 | 3/14 | 3/14 | 3/14 | 5/14 |
| D | 3/14 | 3/14 | 3/14 | 3/14 | 3/14 |

FIG. 7

| FG | 1 | 2 | 3 | 4 | 5 |
|---|---|---|---|---|---|
| 1 | B | A | A | A | A |
| 2 | C | B | A | A | A |
| 3 | D | D | A | A | A |
| 4 | D | A | B | C | D |
| 5 | B | B | A | A | A |

⇒

| Prob | 1 | 2 | 3 | 4 | 5 |
|---|---|---|---|---|---|
| A | 1/14 | 5/14 | 9/14 | 9/14 | 9/14 |
| B | 5/14 | 5/14 | 3/14 | 1/14 | 1/14 |
| C | 3/14 | 1/14 | 1/14 | 3/14 | 1/14 |
| D | 5/14 | 3/14 | 1/14 | 1/14 | 3/14 |

FIG. 8

| FG | 1 | 2 | 3 | 4 | 5 |
|---|---|---|---|---|---|
| ~~1~~ | ~~B~~ | ~~A~~ | ~~A~~ | ~~A~~ | ~~A~~ |
| 2 | C | B | A | A | A |
| 3 | D | D | A | A | A |
| 4 | D | A | B | C | D |
| 5 | B | B | A | A | A |

⇒

| Prob | 1 | 2 | 3 | 4 | 5 |
|---|---|---|---|---|---|
| A | 1/12 | 3/12 | 7/12 | 7/12 | 7/12 |
| B | 3/12 | 5/12 | 3/12 | 1/12 | 1/12 |
| C | 3/12 | 1/12 | 1/12 | 3/12 | 1/12 |
| D | 5/12 | 3/12 | 1/12 | 1/12 | 3/12 |

FIG. 9

| BG | 1 | 2 | 3 | 4 | 5 |
|---|---|---|---|---|---|
| 1 | B | A | A | A | A |
| ~~2~~ | ~~C~~ | ~~B~~ | ~~A~~ | ~~A~~ | ~~A~~ |
| 3 | D | D | A | A | A |
| 4 | D | A | B | C | D |
| 5 | B | B | A | A | A |

⇒

| Prob | 1 | 2 | 3 | 4 | 5 |
|---|---|---|---|---|---|
| A | 1/12 | 5/12 | 7/12 | 7/12 | 7/12 |
| B | 5/12 | 3/12 | 3/12 | 1/12 | 1/12 |
| C | 1/12 | 1/12 | 1/12 | 3/12 | 1/12 |
| D | 5/12 | 3/12 | 1/12 | 1/12 | 3/12 |

| FG | 1 | 2 | 3 | 4 | 5 |
|---|---|---|---|---|---|
| 1 | B | A | A | A | A |
| 2 | C | B | A | A | A |
| ~~3~~ | ~~D~~ | ~~D~~ | ~~A~~ | ~~A~~ | ~~A~~ |
| 4 | D | A | B | C | D |
| 5 | B | B | A | A | A |

_166_

| Prob | 1 | 2 | 3 | 4 | 5 |
|---|---|---|---|---|---|
| A | 1/12 | 5/12 | 7/12 | 7/12 | 7/12 |
| B | 5/12 | 5/12 | 3/12 | 1/12 | 1/12 |
| C | 3/12 | 1/12 | 1/12 | 3/12 | 1/12 |
| D | 3/12 | 1/12 | 1/12 | 1/12 | 3/12 |

| FG | 1 | 2 | 3 | 4 | 5 |
|---|---|---|---|---|---|
| 1 | B | A | A | A | A |
| 2 | C | B | A | A | A |
| 3 | D | D | A | A | A |
| ~~4~~ | ~~D~~ | ~~A~~ | ~~B~~ | ~~C~~ | ~~D~~ |
| 5 | B | B | A | A | A |

_168_

| Prob | 1 | 2 | 3 | 4 | 5 |
|---|---|---|---|---|---|
| A | 1/12 | 3/12 | 9/12 | 9/12 | 9/12 |
| B | 5/12 | 5/12 | 1/12 | 1/12 | 1/12 |
| C | 3/12 | 1/12 | 1/12 | 1/12 | 1/12 |
| D | 3/12 | 3/12 | 1/12 | 1/12 | 1/12 |

| FG | 1 | 2 | 3 | 4 | 5 |
|---|---|---|---|---|---|
| 1 | B | A | A | A | A |
| 2 | C | B | A | A | A |
| 3 | D | D | A | A | A |
| 4 | D | A | B | C | D |
| ~~5~~ | ~~B~~ | ~~B~~ | ~~A~~ | ~~A~~ | ~~A~~ |

_170_

|  | 1 | 2 | 3 | 4 | 5 |
|---|---|---|---|---|---|
| A | 1/12 | 5/12 | 7/12 | 7/12 | 7/12 |
| B | 3/12 | 3/12 | 3/12 | 1/12 | 1/12 |
| C | 3/12 | 1/12 | 1/12 | 3/12 | 1/12 |
| D | 5/12 | 3/12 | 1/12 | 1/12 | 3/12 |

SYSTEM AND METHOD FOR RULE GENERATION USING DATA PROCESSED BY A BINARY CLASSIFIER

FIELD

The present application relates to generating rules from data that is processed by a machine learning binary classifier.

BACKGROUND

Machine learning is a type of artificial intelligence in which a computer is configured to learn without necessarily being explicitly programmed. Machine learning may be used by a computer to perform binary classification, such as predicting whether or not an event will occur. First, the computer may be trained using past data for which the outcome is known. Then, when processing new input data, the computer uses the information learned during training to determine the likelihood of the event occurring given the new input data. If the likelihood is above a certain threshold, then the computer predicts that the event will occur. Otherwise, the computer predicts that the event will not occur. Binary classification that uses machine learning will be called machine learning binary classification, and a computer that implements machine learning binary classification will be called a machine learning binary classifier.

For example, a lending institution may use a machine learning binary classifier to determine whether a loan application should be accepted or rejected. A set of data may be extracted from the loan application that includes information such as the loan applicant's income, loan duration, loan amount, etc. The machine learning binary classifier then uses this set of data to make a prediction: either the loan applicant will default on the loan or not. If the computer returns a prediction that loan default will occur, then the loan application may be rejected.

A machine learning binary classifier may make correct predictions with a satisfactory level of accuracy. However, the process used to arrive at the prediction may be impossible for a human to understand. For example, the machine learning binary classifier may implement a machine learning technique that combines multiple machine learning algorithms and that trains on a large training set to uncover patterns in the training set that influence whether or not the event occurs. The uncovered patterns may not be intuitive or recognizable to a human.

SUMMARY

A method and corresponding system are disclosed that operate in conjunction with machine learning binary classification of an event. The method may generate one or more rules that relate to whether or not the event will occur. The one or more rules may be more understandable to a human compared to the actual decision process used in the machine learning binary classification.

In one embodiment, there is provided a computer-implemented method that may operate in conjunction with machine learning binary classification of an event. The method may generate a rule relating to whether or not the event will occur. The method may include the computer obtaining from memory a set of data having background sequences corresponding to instances of the event not occurring and foreground sequences corresponding to instances of the event occurring, each sequence position of each of the background sequences and the foreground sequences having a respective feature value. The method may further include for each foreground sequence of a plurality of the foreground sequences, the computer computing a plurality of difference values by, for each difference value: obtaining a respective subsequence pattern comprising feature values in a respective set of positions of the selected foreground sequence; and computing a value representing a comparison of: (i) occurrence of the respective subsequence pattern in the other foreground sequences and (ii) occurrence of the respective subsequence pattern in the background sequences, to obtain the difference value. The method may further include determining the rule based on a largest difference value for one of the plurality of foreground sequences.

In some embodiments, the method may further include computing the value representing the comparison by: computing a first probability that the respective subsequence pattern is present in the other foreground sequences; computing a second probability that the respective subsequence pattern is present in the background sequences; and determining the value representing the comparison using the first probability and the second probability.

In some embodiments, determining the value representing the comparison using the first probability and the second probability may include computing a ratio of the first probability and the second probability.

In some embodiments, obtaining the rule may include: computing a score based on at least one of: (i) how often the respective subsequence pattern corresponding to the largest difference value is present in the foreground sequences, and (ii) how often the respective subsequence pattern corresponding to the largest difference value is present in the background sequences; comparing the score to a threshold; mapping the respective subsequence pattern corresponding to the largest difference value to the rule when the score passes the threshold.

In some embodiments, the plurality of the foreground sequences is all of the foreground sequences.

In some embodiments, computing a plurality of difference values for each foreground sequence of a plurality of the foreground sequences and determining the rule is repeated using subsequence patterns of a different length.

In some embodiments, the method may further include generating the set of data by performing operations including: retrieving from memory original data, the original data comprising a plurality of samples, each sample corresponding to an instance of the event either occurring or not occurring, and each sample having a plurality of features, each one of the plurality of features taking on one of a plurality of values; for each sample in the original data: mapping a value of a feature to another feature value of a finite number of categorized feature values; partitioning the samples into the foreground sequences and the background sequences to result in the set of data, wherein each sample is designated as either: (i) a foreground sequence if the sample corresponds to an instance of the event occurring, or (ii) a background sequence if the sample corresponds to an instance of the event not occurring.

In some embodiments, at least one of: (i) the original data is also processed by the machine learning binary classification, and (ii) the original data is from an output of the machine learning binary classification.

In some embodiments, the method may further include sending the rule to a user interface for presentation to a user.

In some embodiments, the event is loan default, and the rule is an if-then rule specifying an if-then condition relating to at least one of: whether loan default will occur and whether loan default will not occur.

In another embodiment, a system may be provided, which may operate in conjunction with machine learning binary classification of an event. The system may be to generate a rule relating to whether or not the event will occur. The system may include a memory to store a set of data having background sequences corresponding to instances of the event not occurring and foreground sequences corresponding to instances of the event occurring, each sequence position of each of the background sequences and the foreground sequences having a respective feature value. The system may further include a rule extractor to: for each foreground sequence of a plurality of the foreground sequences, compute a plurality of difference values by, for each difference value: obtaining a respective subsequence pattern comprising feature values in a respective set of positions of the selected foreground sequence; and computing a value representing a comparison of: (i) occurrence of the respective subsequence pattern in the other foreground sequences and (ii) occurrence of the respective subsequence pattern in the background sequences, to obtain the difference value. The rule extractor may further determine the rule based on a largest difference value for one of the plurality of foreground sequences.

In some embodiments, the rule extractor is configured to compute the value representing the comparison by: computing a first probability that the respective subsequence pattern is present in the other foreground sequences; computing a second probability that the respective subsequence pattern is present in the background sequences; determining the value representing the comparison using the first probability and the second probability.

In some embodiments, the rule extractor is configured to determine the value representing the comparison using the first probability and the second probability by computing a ratio of the first probability and the second probability.

In some embodiments, the rule extractor is configured to obtain the rule by: computing a score based on at least one of: (i) how often the respective subsequence pattern corresponding to the largest difference value is present in the foreground sequences, and (ii) how often the respective subsequence pattern corresponding to the largest difference value is present in the background sequences; comparing the score to a threshold; mapping the respective subsequence pattern corresponding to the largest difference value to the rule when the score passes the threshold.

In some embodiments, the plurality of the foreground sequences is all of the foreground sequences.

In some embodiments, the rule extractor is configured to repeat computing a plurality of difference values for each foreground sequence of a plurality of the foreground sequences and repeat determining the rule using subsequence patterns of a different length.

In some embodiments, the system is configured to generate the set of data by: obtaining original data comprising a plurality of samples, each sample corresponding to an instance of the event either occurring or not occurring, and each sample having a plurality of features, each one of the plurality of features taking on one of a plurality of values; for each sample in the original data: mapping a value of a feature to another feature value of a finite number of categorized feature values; partitioning the samples into the foreground sequences and the background sequences to result in the set of data, wherein each sample is designated as either (i) a foreground sequence if the sample corresponds to an instance of the event occurring, or (ii) a background sequence if the sample corresponds to an instance of the event not occurring.

In some embodiments, the system further includes a binary classifier to perform the machine learning binary classification. In some embodiments, at least one of: (i) the original data is also to be processed by the binary classifier, and (ii) the original data is to be obtained from an output of the binary classifier.

In some embodiments, the system further includes a user interface to present the rule to a user.

In some embodiments, the event is loan default, and the rule is an if-then rule specifying an if-then condition relating to at least one of: whether loan default will occur and whether loan default will not occur.

Other aspects and features will become apparent to those of ordinary skill in the art upon review of the following description.

BRIEF DESCRIPTION OF THE DRAWINGS

Embodiments will be described, by way of example only, with reference to the accompanying figures wherein:

FIGS. 2 and 3 illustrate example data that may be processed;

FIG. 5 illustrates example mapping relationships for mapping features to feature categories;

FIG. 6 illustrates example background sequences along with associated probabilities;

FIGS. 7 to 12 each illustrate example foreground sequences along with associated probabilities;

DETAILED DESCRIPTION

For illustrative purposes, specific example embodiments will now be explained in greater detail below in conjunction with the figures.

Figure 1:
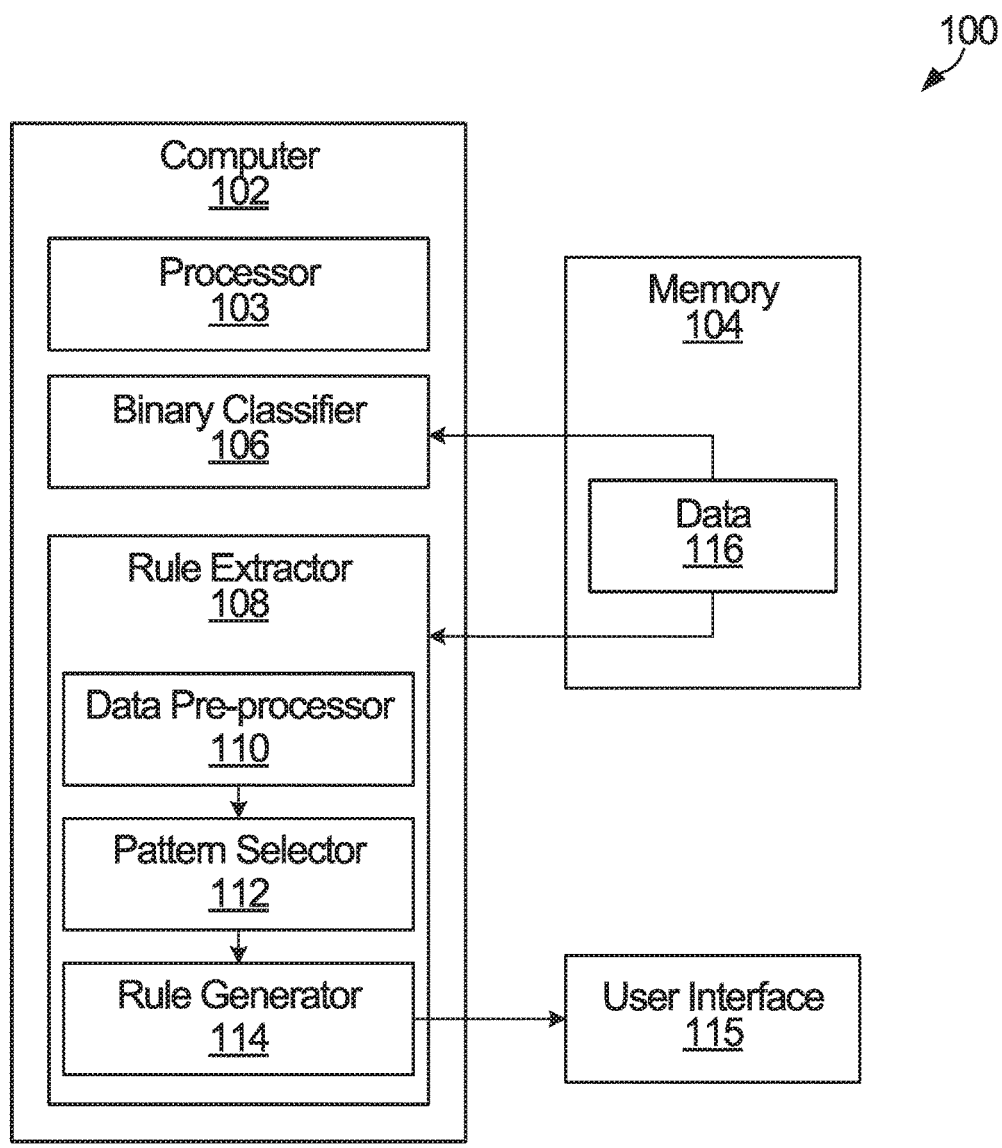
FIG. 1 is a block diagram of a system for performing binary classification and rule extraction according to one embodiment.

FIG. 1 is a block diagram of a system 100 for performing binary classification and rule extraction according to one embodiment. The system 100 includes a computer 102 and a memory 104. The computer 102 is illustrated as a single physical entity, but alternatively the computer 102 may be distributed and connected through a network. The word "computer" is meant to encompass all types of computing devices, whether big or small, distributed, clustered, or self-contained. The computer includes a processor 103. Although the processor 103 is illustrated as a single processor, it may instead be several processors.

The computer 102 implements a binary classifier 106 and a rule extractor 108, each of which may be implemented in one or more of hardware, firmware, or software in combination with one or more processors to run the software. For example, the binary classifier 106 and rule extractor 108 may be implemented by the processor 103 executing a series of instructions defining the actions of the binary classifier 106 and the rule extractor 108. Alternatively, the binary classifier 106 and the rule extractor 108 may each or both comprise dedicated integrated circuitry, such as an application specific integrated circuit (ASIC), a graphics processing unit (GPU), or a programmed field programmable gate array (FPGA) for performing one or more of the functions described herein.

The rule extractor 108 implements a data pre-processor 110, a pattern selector 112, and a rule generator 114, all of which operate in the manner explained below. The system 100 further includes a user interface 115 for presenting to a user one or more rules from the rule extractor 108.

The memory 104 is accessed by the computer 102. In FIG. 1 the memory 104 is illustrated as physically separated from the computer 102, although the memory 104 may be implemented as part of the computer 102. Stored in the memory 104 is data 116. The data 116 comprises records of instances in which a particular event did or did not occur, along with the input factors associated with the outcome for each instance. Each instance will be referred to as a sample, and the input factors will be called features.

FIG. 2 illustrates one example of the data 116. In FIG. 2 there are ten samples respectively labelled Sample 1 to Sample 10. Each sample has five associated features that are respectively labelled Feature V to Feature Z. Each sample also has an associated event outcome: either the event occurred ("YES"), or the event did not occur ("NO"). In actual implementation the number of samples may be much larger than ten, and the number of features associated with each sample may be much larger than five.

Each sample stores a respective value for each feature. The feature values are designated in FIG. 2 using letters $v_1 \ldots v_{10}$ for feature V, $w_1 \ldots w_{10}$ for feature W, $x_1 \ldots x_{10}$ for feature X, $y_1 \ldots y_{10}$ for feature Y, and $z_1 \ldots z_{10}$ for feature Z. The data shown in FIG. 2 may be stored in a 2-D array in the memory 104.

FIG. 3 illustrates example values for the data of FIG. 2. In FIG. 3, the data comprises records relating to ten loan applications. Each sample is associated with a respective loan application. Feature V is "loan amount requested" in dollars, feature W is "loan duration" in months, feature X is "monthly salary" in dollars, feature Y is "average monthly spending of the loan applicant" in dollars, and feature Z is "credit rating of the loan applicant" that is between 1 and 10. The value 1 is a poor credit history, and the value 10 is an excellent credit history. The event associated with each sample is loan default, i.e, whether the loan applicant did end up defaulting on their loan ("YES"), or whether the loan applicant did not end up defaulting on their loan ("NO"). The scenario of loan defaults and the example data illustrated in FIG. 3 will be used as an example when describing the operation of the rule extractor 108.

Returning to FIG. 1, in operation the binary classifier 106 implements machine learning binary classification that first access the data 116 to train the binary classifier 106. The particular machine learning used by the binary classifier 106 is implementation specific, but in general the machine learning may be relatively complex or sophisticated, e.g., an ensemble method in which multiple machine learning algorithms are executed and their results combined.

Once trained, the binary classifier 106 can receive new input data for which the event outcome is unknown, and the binary classifier 106 can make a decision that is a prediction of whether or not the event will occur.

For example, if the data 116 comprises the loan application samples shown in FIG. 3, then the binary classifier 106 trains on the samples. When processing new data relating to a new loan application, the binary classifier 106 can return a prediction of whether or not the loan applicant will default on the loan. The prediction may be used to decide whether or not to reject the loan application.

It may be desirable to generate a simplified representation of the features of the input data that contributed to the decision of the binary classifier 106. For example, in the loan application scenario, the loan applicant may want to know the reasons why their loan application was rejected.

The rule extractor 108 performs the function of generating this simplified representation. The data pre-processor 110 in the rule extractor 108 first processes the data 116, as necessary, to ensure the data 116 is in a form for pattern selection, then the pattern selector 112 determines candidate patterns of features in the data 116, and then the rule generator 114 generates, if possible, one or more if-then rules. The one or more rules generated by the rule extractor 108 may be directly presented to the user interface 115, as shown in FIG. 1, or instead returned to the memory 104 to be subsequently retrieved for presentation to a human accessing the computer 102 through the user interface 115.

In the loan application scenario, an example of a rule returned by the rule extractor 108 may be: IF loan amount <$1000 AND loan period <6 months AND monthly salary <$1000, THEN Loan Default. This extracted rule may not be as accurate as the actual decision process the binary classifier 106 goes through to arrive at the prediction of loan default, but the rule from the rule extractor 108 does provide some insight into what factors are contributing to the decision of the binary classifier 106 in a form more easily understandable to a human. The loan applicant may then be informed that their loan application was rejected because of factors including their asking for a loan amount of less than $1000 for a loan period of less than 6 months and their only having a monthly salary of less than $1000 per month.

Operation of the Data Pre-Processor 110

Figure 4:
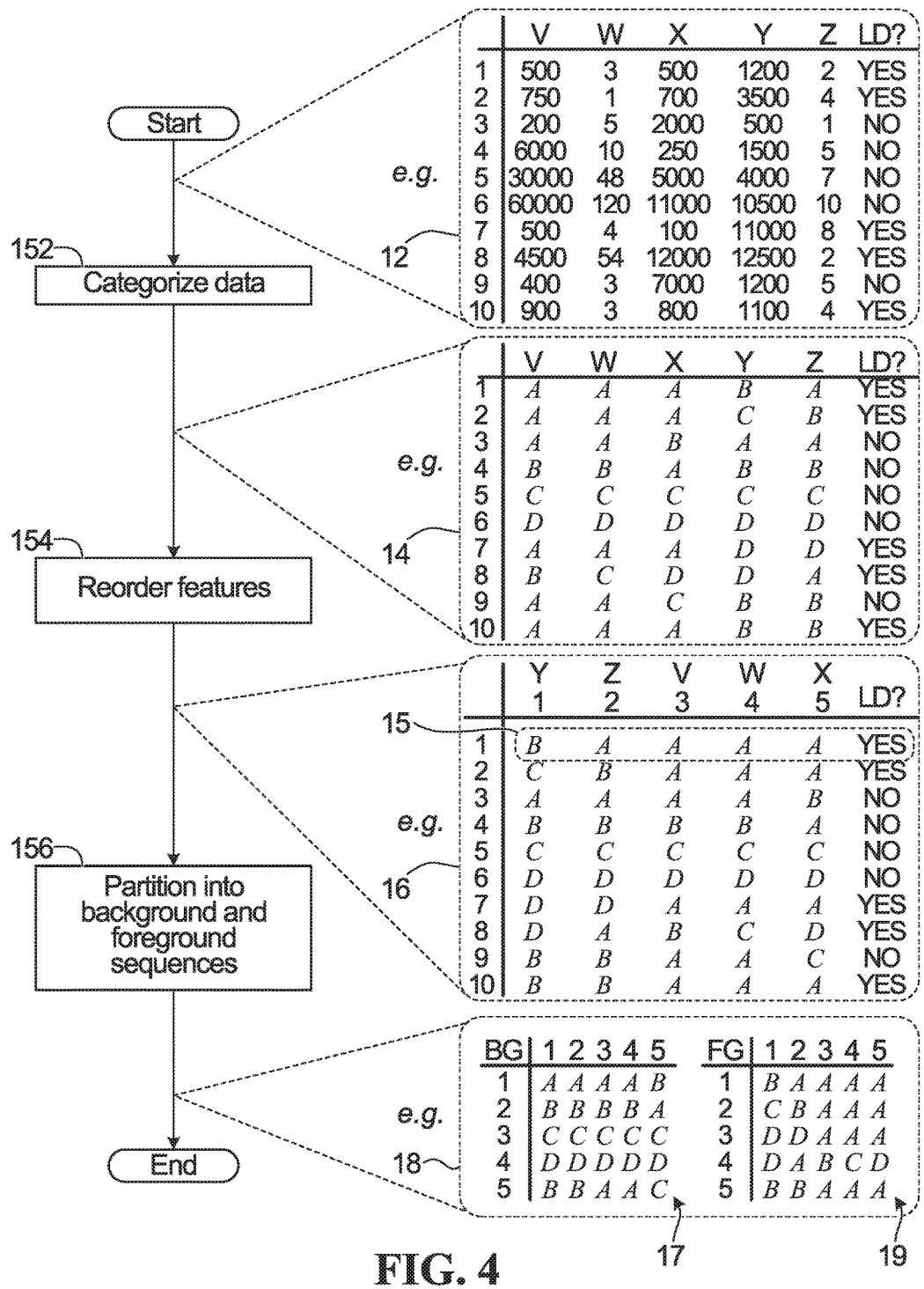
FIG. 4 is a flowchart of operations performed by the data pre-processor according to one embodiment.

FIG. 4 is a flowchart of operations performed by the data pre-processor 110 according to one embodiment. FIG. 4 also illustrates, in stippled line bubbles, an example of each operation. The example operations in the stippled line bubbles are based on the samples illustrated in FIG. 3, and will be referred to throughout much of the description.

In step 152, the data 116 is categorized. Step 152 comprises, for each feature, mapping each possible value of the feature to one of a finite number of categorized feature values. For example, if the feature is average monthly spending, then any average monthly spending that is less than $1000 may be mapped to one categorized feature value, any average monthly spending that is between $1000 and $2000 may be mapped to another categorized feature value, etc. The number of categorized feature values corresponding to each feature is denoted using Σ, and the value of Σ may be different for each feature. The categorized feature values will be denoted A, B, C, . . . , etc. herein. Thus, a feature i has a corresponding alphabet of categorized feature values $\Sigma \in \{A, B, C \ldots\}$.

In this example, bubble 12 illustrates the data of FIG. 3. This data is categorized in step 152 to result in the data shown in bubble 14. Each one of the values of each feature is mapped to one of four categorized feature values A, B, C, or D, according to the example mapping relationship illustrated in FIG. 5. For example, feature value $v_1$=$500 and so is mapped to categorized feature value A, feature value $v_2$=$750 and so is also mapped to category A, and so on.

Step 152 is not needed if the data 116 is already in a categorized form. Also, it may be that not all of the features need to be categorized. Further, the example shows all of features V to Z having the same number of categorized feature values A to D. There may instead be a different number of categorized feature values for each feature. Also, performance of the rule extractor 108 may be enhanced if the mapping of feature values to categorized feature values is determined by the computer 102 in accordance with the distribution of the feature values. For example, if the monthly salary for 98% of loan applicants was between $3000 and $10,000, then the categorized feature values for the monthly salary shown in FIG. 5 may be chosen to have more granularity within $3000 to $10,000, e.g.:

| MONTHLY SALARY ($) |
|---|
| IF Monthly Salary <$3000 THEN Categorized Feature Value A |
| IF $3000 ≤ Monthly Salary < $5000 THEN Categorized Feature Value B |
| IF $5000 ≤ Monthly Salary < $7000 THEN Categorized Feature Value C |
| IF $7000 ≤ Monthly Salary < $10,000 THEN Categorized Feature Value D |
| IF Monthly Salary ≥$10,000 THEN Categorized Feature Value E |

The selection of categorized feature values may be programmed into the computer 102, or alternatively a computer implemented algorithm may be used in creating the categorized feature value, such as: a Minimum Description Length Principle (MDLP) algorithm, a Chi2 algorithm, a Class-Attribute Contingency Coefficient (CACC) algorithm, a Class-Attribute Interdependence Maximization (CAIM) algorithm, the Ameva algorithm, or other categorization algorithms. An unsupervised computer algorithm, such as a histogram, may also or instead be used to further reduce the number of categories.

With reference again to FIG. 4, in step 154 the categorized data is re-ordered to place particular features adjacent to each other. In this example, bubble 16 illustrates the data reordered so that features Y and Z are before features V and W, and by doing so, features Z and V are now adjacent to each other.

Step 154 may be performed before step 152. Also, step 154 is not needed if the data provided to the rule extractor 108 is already in a suitable order, or if an embodiment is implemented in which the order of the features is not considered or is accommodated in another manner. The re-ordering may be programmed into the computer 102 by a human that has knowledge or insight as to why certain features are best adjacent to each other, or alternatively the re-ordering may be automatically performed using a computer implemented algorithm. For example, machine learning may be executed by the computer 102 on the data 116 to rank the features in the data 116 in terms of their importance, and the highest ranked features may then be placed adjacent to each other. Features that have more influence on the outcome of the event may be considered more important and placed adjacent to each other. One example machine learning algorithm that may be used is stepwise regression, which is a greedy algorithm that adds the best feature or deletes the worst feature one at a time. A feature is considered to be a best feature if it has the most influence on the outcome of the event, and a feature is considered to be a worst feature if it has the least influence on the outcome of the event. At the end of the calculation, the algorithm selects the list of important features that affect the outcome. These identified important features may then be placed adjacent to each other in the re-ordering in step 154.

The set of feature values associated with each sample form a sequence. Each sequence has a number of positions equal to the number of features. Each position in each sequence corresponds to a respective one of the features. The sequence of feature values forms a sequence pattern. For example, bubble 15 in FIG. 4 shows sequence 1, which has 5 positions, with each position corresponding to a respective feature. The sequence pattern is BAAAA. Position 1 of sequence 1 has the value B, position 2 of sequence 1 has the value A, position 3 of sequence 1 has the A, position 4 of sequence 1 has the value A, and position 5 of sequence 1 also has the value A. The length of the sequence L is equal to the number of positions, and in this example L=5.

In step 156, the set of sequences are partitioned into two sets: (1) those designated as the background (BG) sequences, which comprise all of the sequences in which the event did not occur; and (2) those designated the foreground (FG) sequences, which comprise all of the sequences in which the event did occur. In this example, bubble 18 illustrates the set of sequences in bubble 16 partitioned into: (i) background sequences 17 in which the event of loan default did not occur, i.e., loan default=NO; and (ii) foreground sequences 19, in which the event of loan default did occur, i.e. loan default=YES. Sequences 3 to 6 and 9 of the data of bubble 16 are mapped to the background sequences 17, and sequences 1, 2, 7, 8, and 10 of the data of bubble 16 are mapped to the foreground sequences 19.

The output of step 156 is the output of the data pre-processor 110.

Other Possible Operations of the Data Pre-Processor 110

The data pre-processor 110 may perform other operations not illustrated in FIG. 4. Two examples will be described.

Prior to steps 152 and 154, the data pre-processor 110 may perform over-sampling or under-sampling of the data 116 to make unbalanced data more balanced. In the samples illustrated in FIG. 3, there are an equal number of samples in which loan default did and did not occur, and thus the samples are balanced. The number of foreground sequences is equal to the number of background sequences, as shown in bubble 18. Alternatively, the data 116 may be unbalanced, i.e., one set of sequences may be larger than the other. The larger set is called the major class, and the smaller set is called the minor class.

In the loan default scenario, loan defaults are typically not that common, and so the number of instances in which loan default does not occur may far outnumber the number of instances in which loan default does occur. That is, there may be a large number of background sequences and only a small number of foreground sequences. The rule extractor 108 may perform better if the data 116 is more balanced, and so the data pre-processor 110 may perform data balancing to either balance the data 116 or to at least make the data less unbalanced. One way to perform data balancing is to perform under-sampling, e.g., delete some of the samples from the majority class. For example, if there are many more instances in which loan default does not occur, then some of such samples may be deleted, and this would reduce the number of background sequences. Alternatively, over-sampling may be performed, e.g., by synthetically creating more samples for the minority class. For example, if there are many fewer instances in which loan default actually does occur, then some or all of the samples in which loan default does occur may be used to create synthetic new samples in which loan default also occurs, such that the number of foreground sequences is increased. One way to create synthetic foreground sequences is to use the Synthetic Minority Over-sampling Technique (SMOTE).

The data pre-processor 110 may also perform feature scaling, which refers to scaling the feature values so that they are within a predefined range. For example, a unity-based normalization step may be performed in which all values for each feature are mapped to the range [0,1]. The data pre-processor 110 may perform the following computation to result in the normalization: $x'=(x-x_{min})/(x_{max}-x_{min})$, where x is a particular feature value, x' is the corresponding scaled value, $x_{min}$ is the smallest possible value for the feature, and $x_{max}$ is the largest possible value for the feature. For example, if the feature is X "monthly salary", and the maximum monthly salary in the data is $12000 and the minimum monthly salary in the data is $100, then $x_{max}=12000$ and $x_{min}=100$. If the monthly salary for a particular sample was x=5000, then the scaled value would be x'=(5000−100)/(12000−100)=0.4117647.

Category Probabilities in the Sequences

For a given set of background sequences, each position in each background sequence will be assigned one of the possible categorized feature values. Therefore, a probability may be computed that a particular position has a particular categorized feature value. For example, FIG. 6 illustrates the background sequences 17 from bubble 18 of FIG. 4, along with associated probabilities 160. At position 1 of background sequence 1, the categorized feature value is A, as shown at 157. At position 1 of background sequence 2 the categorized feature value is B, at position 1 of background sequence 3 the categorized feature value is C, at position 1 of background sequence 4 the categorized feature value is D, and at position 1 of background sequence 5 the categorized feature value is B. Position 1 of a given background sequence can therefore take on one of four values: A, B, C, or D. A probability that position 1 of a background sequence takes on a particular one of the four values may be computed using the background sequences. The same can be done for each of the other background sequence positions. The probabilities are shown in table 160. The probability may be computed as follows:

$$p_{i,j} = \frac{F_{i,j} + b_j}{N + B_j},$$

where $p_{i,j}$ is the probability that position j in a background sequence will be value i, $F_{i,j}$ is the frequency of value i at position j, $b_j$ is a predetermined number associated with position j to ensure a minimum probability for value i if the associated frequency $F_{i,j}$ is zero. N is the total number of background sequences, and $B_j$ is equal to the alphabet size, i.e., the number of possible categorized feature values, multiplied by $b_j$. In all examples shown herein, $b_j=0.5$.

The frequency $F_{i,j}$ of value i at position j may be computed by the computer 102 counting how many times the value i is present at position j in the set of background sequences. For example, for the set of background sequences 17, the values A, C, and D are each present once in position 1, whereas the value B is present twice: at position 1 of sequence 2 and at position 1 of sequence 5. The frequency of each value at each position may be computed and stored in a position weight matrix (PWM). For example, the PWM for background sequences 17 is:

| PWM | 1 | 2 | 3 | 4 | 5 |
|-----|---|---|---|---|---|
| A | 1 | 1 | 2 | 2 | 1 |
| B | 2 | 2 | 1 | 1 | 1 |
| C | 1 | 1 | 1 | 1 | 2 |
| D | 1 | 1 | 1 | 1 | 1 |

Alternatively, the computer may build multiple smaller PWMs instead of the PWM above. For example, L−K+1 PWMs may be built, where L represents the number of positions in a background sequence, and each PWM is for a subset of K<L positions. For example, for K=3:

| PWM | 1 | 2 | 3 | PWM | 2 | 3 | 4 | PWM | 3 | 4 | 5 |
|-----|---|---|---|-----|---|---|---|-----|---|---|---|
| A | 1 | 1 | 2 | A | 1 | 2 | 2 | A | 2 | 2 | 1 |
| B | 2 | 2 | 1 | B | 2 | 1 | 1 | B | 1 | 1 | 1 |
| C | 1 | 1 | 1 | C | 1 | 1 | 1 | C | 1 | 1 | 2 |
| D | 1 | 1 | 1 | D | 1 | 1 | 1 | D | 1 | 1 | 1 |

Each of the three smaller PWMs may be generated by the computer 102 as needed to assist in computing the probabilities in the operation of the pattern selector 112 described below.

Using the probability computation formula mentioned above, the probability that position 1 of a background sequence is the value A is:

$$p_{A,1} = \frac{F_{A,1} + b_1}{N + B_1} = \frac{1 + 0.5}{5 + 4*0.5} = \frac{1.5}{7} = \frac{3}{14}.$$

The probability that position 1 of a background sequence is the value B is:

$$p_{B,1} = \frac{F_{B,1} + b_1}{N + B_1} = \frac{2 + 0.5}{5 + 4*0.5} = \frac{2.5}{7} = \frac{5}{14}.$$

The probability that position 3 of a background sequence is the value A is $$p_{A,3} = \frac{F_{A,3} + b_1}{N + B_1} = \frac{2 + 0.5}{5 + 4*0.5} = \frac{2.5}{7} = \frac{5}{14}.$$

The table 160 in FIG. 6 illustrates the probability of each possible value at each position in a background sequence.

FIGS. 7 to 12 illustrate example foreground sequence sets and associated probabilities. The probabilities are computed in the same manner as described above in relation to the background sequences, that is, using $$p_{i,j} = \frac{F_{i,j} + b_j}{N + B_j},$$

except that the set of foreground sequences are used instead of the background sequences.

FIG. 7 illustrates the foreground sequences 19 from bubble 18 of FIG. 4 and associated probabilities 161. In the operation of the pattern selector 112 described below, the probability of subsequence patterns is required for situations in which one of the foreground sequences is removed. Therefore, FIG. 8 illustrates the foreground sequences 19 with foreground sequence #1 removed and associated probabilities 162; FIG. 9 illustrates the foreground sequences 19 with foreground sequence #2 removed and associated probabilities 164; FIG. 10 illustrates the foreground sequences 19 with foreground sequence #3 removed and associated probabilities 166; FIG. 11 illustrates the foreground sequences 19 with foreground sequence #4 removed and associated probabilities 168; and FIG. 12 illustrates the foreground sequences 19 with foreground sequence #5 removed and associated probabilities 170.

In this example, each feature has the same number of corresponding categorized feature values: A, B, C, and D. Alternatively, different features may have a different numbers of categorized feature values, in which case the feature having corresponding categorized feature values of the largest alphabet size would be used to create the probability tables. For example, if position 1 of the background sequences could be one of five categorized feature values A, B, C, D, or E, then the table 160 in FIG. 6 would have values A to E in the first column. The probability of E for each of positions 2 to 5 would still be computed using the probability formula above, but the probability would be close to zero because the frequency of E at each of positions 2 to 5 would always be zero.

Operation of the Pattern Selector 112

Figure 13A:
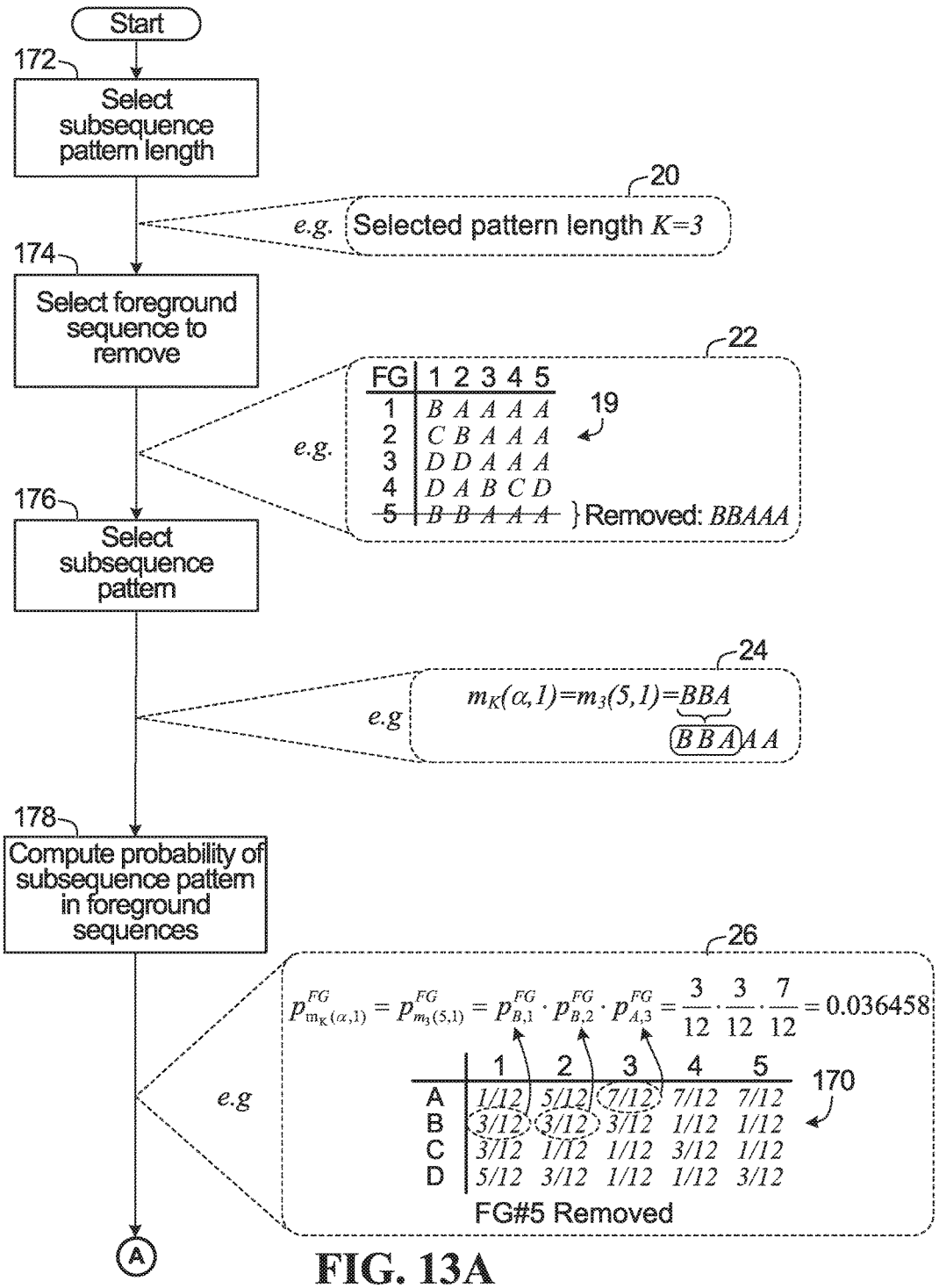
FIGS. 13A and 13B in combination are a flowchart of operations performed by the pattern selector according to one embodiment.
Figure 13B:
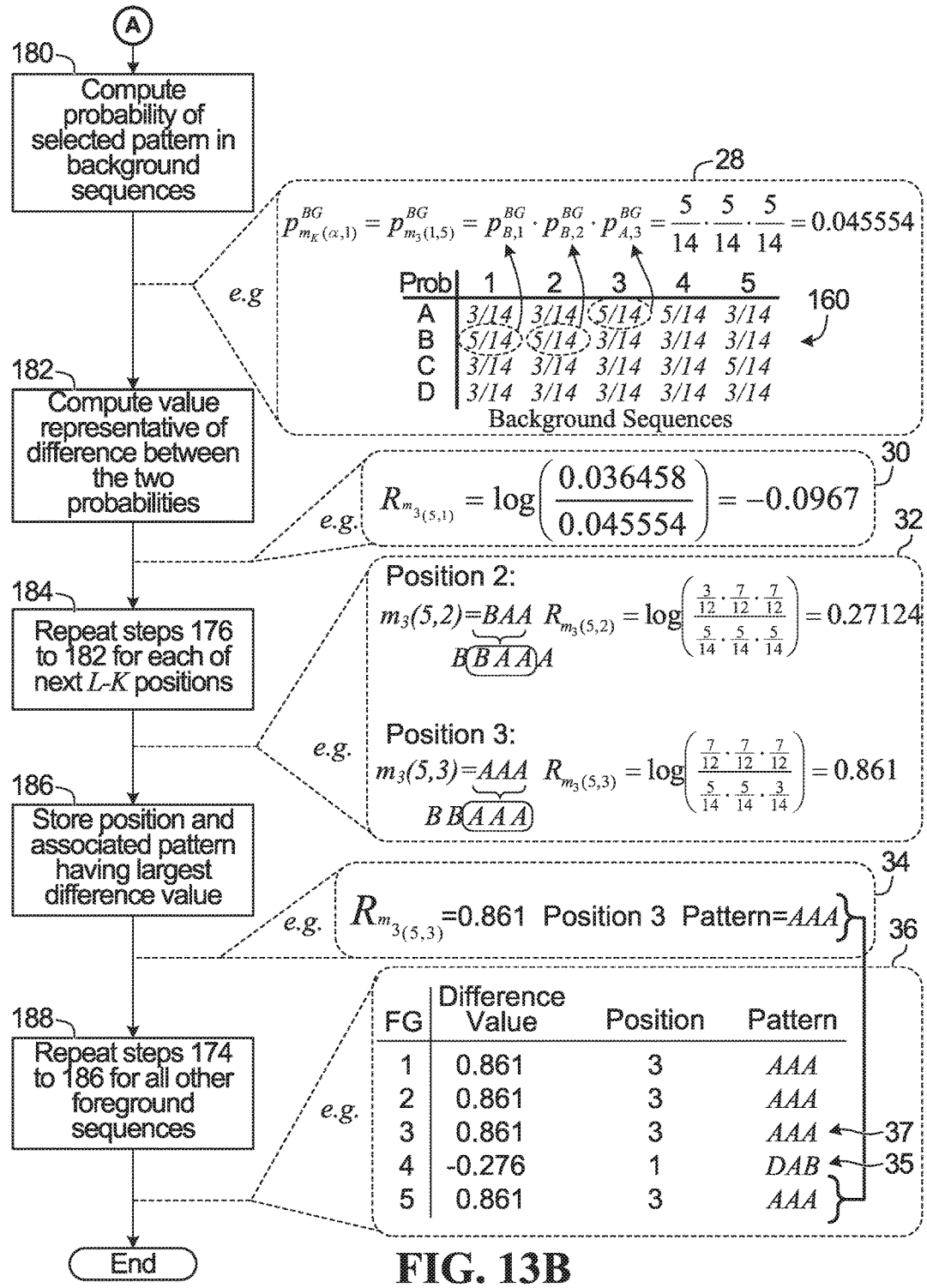

FIGS. 13A and 13B in combination are a flowchart of operations performed by the pattern selector 122 according to one embodiment. FIGS. 13A and 13B also illustrate, in stippled line bubbles, an example of each operation. In this example, the background sequences 17 and foreground sequences 19 from FIG. 4 are used.

In step 172, a subsequence pattern length K is selected that is at least length 1 and is no longer than the sequence length L. In this example, the sequence length L is equal to 5, and subsequence pattern length K=3 is selected, as shown in bubble 20.

In step 174, one of the foreground sequences is removed. The removed foreground sequence is designated as foreground sequence $\alpha$. The removed foreground sequence $\alpha$ has an associated foreground sequence pattern $m(\alpha)$. In this example, foreground sequence 5 is removed, as shown in bubble 22. Removed foreground sequence 5 has associated sequence pattern m(5)=BBAAA.

The removed foreground sequence pattern $m(\alpha)$ has L−K+1 subsequence patterns, each of length K, and each beginning at a respective position j, where $1 \leq j \leq (L-K+1)$. The notation $m_K(\alpha, j)$ will be used to denote a subsequence pattern of length K that begins at position j in removed foreground sequence $\alpha$.

In this example, foreground sequence 5 has been removed. Removed foreground sequence 5 has associated sequence pattern m(5)=BBAAA and sequence length L=5, and subsequence pattern length K=3 has been selected. Therefore, there are L−K+1=5−3+1=3 subsequence patterns of length 3, the first one beginning at position j=1, the second one beginning at position j=2, and the third one beginning at position j=3. The three subsequence patterns are: $m_3(5,1)$=BBA, $m_3(5,2)$=BAA, and $m_3(5,3)$=AAA.

In step 176 one subsequence pattern $m_K(\alpha, 1)$ is selected. In this example, $m_3(5,1)$=BBA is selected, as shown in bubble 24.

A difference value is then computed representing a comparison of (i) occurrence of the subsequence pattern $m_K(\alpha, 1)$ in the remaining foreground sequences and (ii) occurrence of the subsequence pattern $m_K(\alpha, 1)$ in the background sequences. One way to do this is shown in steps 178 to 182.

In step 178, the probability of the subsequence pattern appearing in the remaining foreground sequences is computed. The probability is denoted using the notation $p_{m_K(\alpha,1)}^{FG}$. The probability may be computed by multiplying together: (a) the probability of the feature value at the first position of the selected subsequence pattern being located in the corresponding position of the remaining foreground sequences, and (b) the probability of the feature value at the second position of the selected subsequence pattern being located in the corresponding position of the remaining foreground sequences, and . . . (k) the probability of the feature value at the $K^{th}$ position of the selected subsequence pattern being located in the corresponding position of the remaining foreground sequences.

In this example, subsequence pattern $m_3(5,1)$=BBA is selected, so $p_{m_3(5,1)}^{FG}$ is to be computed, that is, the probability that the subsequence pattern BBA, which begins at position 1, is present in the remaining foreground sequences. The remaining foreground sequences are sequences 1 to 4, because foreground sequence 5 has been removed. The value $p_{m_3(5,1)}^{FG}$ may be computed by obtaining: (a) the probability that value B is at position 1 of the remaining foreground sequences, denoted as $p_{B,1}^{FG}$; (b) the probability that value B is at position 2 of the remaining foreground sequences, denoted as $p_{B,2}^{FG}$; and (c) the probability that value A is at position 3 of the remaining foreground sequences, denoted as $p_{A,3}^{FG}$, and then multiplying these probabilities together: $p_{m_3(5,1)}^{FG}=p_{B,1}^{FG} \cdot p_{B,2}^{FG} \cdot p_{A,3}^{FG}$. The values $p_{B,1}^{FG}$, $p_{B,2}^{FB}$, and $p_{A,3}^{FG}$ may be obtained from the probability table associated with the foreground sequences when foreground sequence 5 is removed, i.e., table 170 in FIG. 12, which is also shown in bubble 26 of FIG. 13A. From table 170:

$$p_{B,1}^{FG} = \frac{3}{12}, p_{B,2}^{FG} = \frac{3}{12}, \text{ and } p_{A,3}^{FG} = \frac{7}{12},$$

and therefore $$p_{m_3(5,1)}^{FG} = \frac{3}{12} \cdot \frac{3}{12} \cdot \frac{7}{12} = 0.036458,$$

as shown in bubble 26.

In step 180, the probability of the subsequence pattern appearing in the background sequences is computed. The probability is denoted using the notation $p_{m_K(\alpha,1)}^{BG}$. The probability may be computed by multiplying together: (a) the probability of the feature value at the first position of the selected subsequence pattern being located in the corresponding position of the background sequences, and (b) the probability of the feature value at the second position of the selected subsequence pattern being located in the corresponding position of the background sequences, and . . . (k) the probability of the feature value at the $K^{th}$ position of the selected subsequence pattern being located in the corresponding position of the background sequences.

In this example, subsequence pattern $m_3(5,1)$=BBA is selected, so $p_{m_3(5,1)}^{BG}$ is to be computed, that is, the probability that the subsequence pattern BBA, which begins at position 1, is present in the background sequences. The probability may be computed by obtaining: (a) the probability that value B is at position 1 of the background sequences, denoted as $p_{B,1}^{BG}$; (b) the probability that value B is at position 2 of the background sequences, denoted as $p_{B,2}^{BG}$; and (c) the probability that value A is at position 3 of the background sequences, denoted as $p_{A,3}^{BG}$, and then multiplying these probabilities together: $p_{m_3(5,1)}^{BG}=p_{B,1}^{BG} \cdot p_{B,2}^{BG} \cdot p_{A,3}^{BG}$. The values $p_{B,1}^{BG}$, $p_{B,2}^{BG}$, and $p_{A,3}^{BG}$ are obtained from the probability table associated with the background sequences, i.e., table 160 in FIG. 6, which is also shown again in bubble 28 of FIG. 13B. From table 160:

$$p_{B,1}^{BG} = \frac{5}{14},\ p_{B,2}^{BG} = \frac{5}{14},\ \text{and}\ p_{A,3}^{BG} = \frac{5}{14},$$

and therefore $$p_{m_3(5,1)}^{BG} = \frac{5}{14} \cdot \frac{5}{14} \cdot \frac{5}{14} = 0.045554,$$

as shown in bubble 28.

Next, in step 182, a difference value representative of the difference between the foreground probability (step 178) and the background probability (step 180) is computed. The value represents a comparison between occurrence of the subsequence pattern $m_K(\alpha, 1)$ in the remaining foreground sequences and occurrence of the subsequence pattern $m_K(\alpha, 1)$ in the background sequences. The value will be denoted $R_{m_K(\alpha,1)}$. The value $R_{m_K(\alpha,1)}$ may be computed as the log likelihood ratio (LLR) of the foreground and background probabilities:

$$R_{m_K(\alpha,1)} = \log\left(\frac{p_{m_K(\alpha,1)}^{FG}}{p_{m_K(\alpha,1)}^{BG}}\right),$$

which in implementation may alternatively be computed as $(p_{m_K(\alpha,1)}^{FG}) - \log(p_{m_K(\alpha,1)}^{BG})$. The LLR may use any base, but the base is chosen as ten in this example. Computing a LLR has the following potential benefits:

(1) The sign of the LLR indicates the direction of the difference. For example, a positive LLR value means that the probability of the subsequence pattern in the foreground patterns is greater than the probability of the subsequence pattern in the background patterns. Knowing the direction of the difference may assist in determining whether a pattern is over-represented or under-represented, as will be discussed later.

(2) The LLR helps to even out skewed distributions. Skewed distributions occur in implementations in which the ratio of the foreground to background probability varies in magnitude depending upon the subsequence pattern.

In other implementations a ratio of the probabilities without LLR may be used, or even a subtraction of the two values may be used.

In this example, as shown in bubble 30:

$$R_{m_K(\alpha,1)} = R_{m_3(5,1)} = \log\left(\frac{0.036458}{0.045554}\right) = -0.0967.$$

Next, in step 184, the operations in steps 176 to 182 are repeated L−K times, for each of the next L−K subsequence patterns of the removed foreground sequence.

In this example steps 176 to 182 are repeated L−K=2 times, for each of the next L−K=2 subsequence patterns: $m_3(5,2)$=BAA and $m_3(5,3)$=AAA. For position 2, the probability of the subsequence pattern BAA in the foreground sequences from table 170 is $$p_{m_3(5,2)}^{FG} = p_{B,2}^{FG} \cdot p_{A,3}^{FG} \cdot p_{A,4}^{FG} = \frac{3}{12} \cdot \frac{7}{12} \cdot \frac{7}{12},$$

the probability of the subsequence pattern BAA in the background sequences from table 160 is $$p_{m_3(5,2)}^{BG} = p_{B,2}^{BG} \cdot p_{A,3}^{BG} \cdot p_{A,4}^{BG} = \frac{5}{14} \cdot \frac{5}{14} \cdot \frac{5}{14},$$

and therefore $$R_{m_3(5,2)} = \log\left(\frac{\frac{3}{12} \cdot \frac{7}{12} \cdot \frac{7}{12}}{\frac{5}{14} \cdot \frac{5}{14} \cdot \frac{5}{14}}\right) = 0.27124.$$

For position 3, the probability of the subsequence pattern AAA in the foreground sequences from table 170 is $$p_{m_3(5,3)}^{FG} = p_{A,3}^{FG} \cdot p_{A,4}^{FG} \cdot p_{A,5}^{FG} = \frac{7}{12} \cdot \frac{7}{12} \cdot \frac{7}{12},$$

the probability of the subsequence pattern AAA in the background sequences from table 160 is $$p_{m_3(5,3)}^{BG} = p_{A,3}^{BG} \cdot p_{A,4}^{BG} \cdot p_{A,5}^{BG} = \frac{5}{14} \cdot \frac{5}{14} \cdot \frac{3}{14},$$

and therefore $$R_{m_3(5,3)} = \log\left(\frac{\frac{7}{12} \cdot \frac{7}{12} \cdot \frac{7}{12}}{\frac{5}{14} \cdot \frac{5}{14} \cdot \frac{3}{14}}\right) = 0.861.$$

If tables 160 to 170 are not precomputed and stored in advance, then PWMs may be generated, as described earlier, to assist in obtaining the individual probabilities, as needed. For example, L−K+1 PWMs, each for K positions may be generated, in the manner explained earlier, for the background sequences, and also for the remaining foreground sequences.

At step 186, the plurality of difference values $R_{m_K(\alpha,1)}$ to $R_{m_K(\alpha,L-K+1)}$ are then compared and the largest one selected and stored. Step 186 may be referred to as maximizing the difference between the background and foreground sequences, for a particular removed foreground sequence. The subsequence pattern associated with the largest value, as well as the associated starting position of the pattern, is also stored. In some embodiments, if the values $R_{m_K(\alpha,1)}$ to $R_{m_K(\alpha,L-K+1)}$ are all close to each other, then no one value is selected.

In this example, the difference values are $R_{m_3(5,1)}$=−0.0967, $R_{m_3(5,2)}$=0.27124, and $R_{m_3(5,3)}$=0.861. The largest difference value $R_{m_3(5,3)}$=0.861 is chosen, as shown at bubble 34. The value 0.861 is stored, along with associated subsequence pattern AAA and starting position 3.

In step 188, the operations in steps 174 to 186 are repeated for each of the other cases where a different foreground sequence is removed. By the end of step 188, for each removed foreground sequence, there is a corresponding selected difference value $R_{m_3(\alpha,j)}$ and associated subsequence pattern and starting position. The difference values may be stored as an array in memory of the computer 102.

Bubble 36 illustrates the result of step 188 for this example. For each removed foreground sequence, the respective probability table in FIGS. 8 to 11 is used to compute the probability of each selected subsequence pattern in the foreground sequences. For example, consider steps 174 to 188 for this example in the case in which foreground sequence 4 is instead removed. Foreground sequence 4 has the associated sequence pattern m(4)= DABCD. For subsequence pattern length K=3, the subsequence pattern at position 1 is $m_3(4,1)$=DAB, the subsequence pattern at position 2 is $m_3(4,2)$=ABC, and the subsequence pattern at position 3 is $m_3(4,3)$=BCD. Using table 168 in FIG. 11 for the foreground sequence probabilities, and table 160 in FIG. 6 for the background sequence probabilities, the three difference values are $$R_{m_3(4,1)} = \log\left(\frac{\frac{3}{12} \cdot \frac{3}{12} \cdot \frac{1}{12}}{\frac{3}{14} \cdot \frac{3}{14} \cdot \frac{3}{14}}\right) = -0.276,$$

$$R_{m_3(4,2)} = \log\left(\frac{\frac{3}{12} \cdot \frac{1}{12} \cdot \frac{1}{12}}{\frac{3}{14} \cdot \frac{3}{14} \cdot \frac{3}{14}}\right) = -0.7534,$$

$$\text{and } R_{m_3(4,3)} = \log\left(\frac{\frac{1}{12} \cdot \frac{1}{12} \cdot \frac{1}{12}}{\frac{3}{14} \cdot \frac{3}{14} \cdot \frac{3}{14}}\right) = -1.2305.$$

The largest difference value is $R_{m_3(4,1)}$=−0.276, which has associated subsequence pattern $m_3(4,1)$=DAB that begins at position 1. The largest difference value and the associated subsequence pattern is stored in the table in bubble 36 of FIG. 13B, as shown at 35. In an alternative embodiment, the difference between −1.2305 and −0.276 may be determined not to be large enough in magnitude to store, in which case the pattern selector 112 would not store any pattern at line 35 of the table in bubble 36.

As another example, consider steps 174 to 188 for this example in the case in which foreground sequence 3 is instead removed. Foreground sequence 3 has the associated sequence pattern m(3)=DDAAA. For subsequence pattern length K=3, the subsequence pattern at position 1 is $m_3(3, 1)$=DDA, the subsequence pattern at position 2 is $m_3(3,2)$=DAA, and the subsequence pattern at position 3 is $m_3(3,3)$=AAA. Using table 166 in FIG. 10 for the foreground sequence probabilities, and table 160 in FIG. 6 for the background sequence probabilities, the three difference values are $$R_{m_3(3,1)} = \log\left(\frac{\frac{3}{12} \cdot \frac{1}{12} \cdot \frac{7}{12}}{\frac{3}{14} \cdot \frac{3}{14} \cdot \frac{5}{14}}\right) = -0.130,$$

$$R_{m_3(3,2)} = \log\left(\frac{\frac{1}{12} \cdot \frac{7}{12} \cdot \frac{7}{12}}{\frac{3}{14} \cdot \frac{5}{14} \cdot \frac{5}{14}}\right) = 0.016,$$

$$\text{and } R_{m_3(3,3)} = \log\left(\frac{\frac{7}{12} \cdot \frac{7}{12} \cdot \frac{7}{12}}{\frac{5}{14} \cdot \frac{5}{14} \cdot \frac{3}{14}}\right) = 0.861.$$

The largest difference value is $R_{m_3(3,3)}$=0.861, which has associated subsequence pattern $m_3(3,3)$=AAA that begins at position 3. The largest difference value and associated subsequence pattern is stored in the table in bubble 36 of FIG. 13B, as shown at 37.

The table in bubble 36 of FIG. 13B is called a position table. A position table may be initialized to have one row for each foreground sequence. Each row will be called an entry. Each entry may represent a potential start position of a subsequence pattern in the respective foreground sequence. The values in the position table may then be updated by performing steps 174 to 186 until the position table is finalized, that is, until steps 174 to 186 are completed for all foreground sequences. In alternative implementations, the position table need not store the subsequence patterns, but the subsequence patterns may be retrieved by the computer 102 from another location, as needed. Also, the position table need not be used at all in some implementations. Each of the relevant data that would be in the position table may be stored in some other location known by the computer 102.

At the end of step 188, the output comprises a group of subsequence patterns and associated starting positions. There is one subsequence pattern associated with each foreground sequence, except alternatively in some implementations one or more of the foreground sequences may not have a selected subsequence pattern if the difference values were determined to be too close to each other. The output of step 188 is the output of the pattern selector 112.

Operation of the Rule Generator 114

Figure 14:
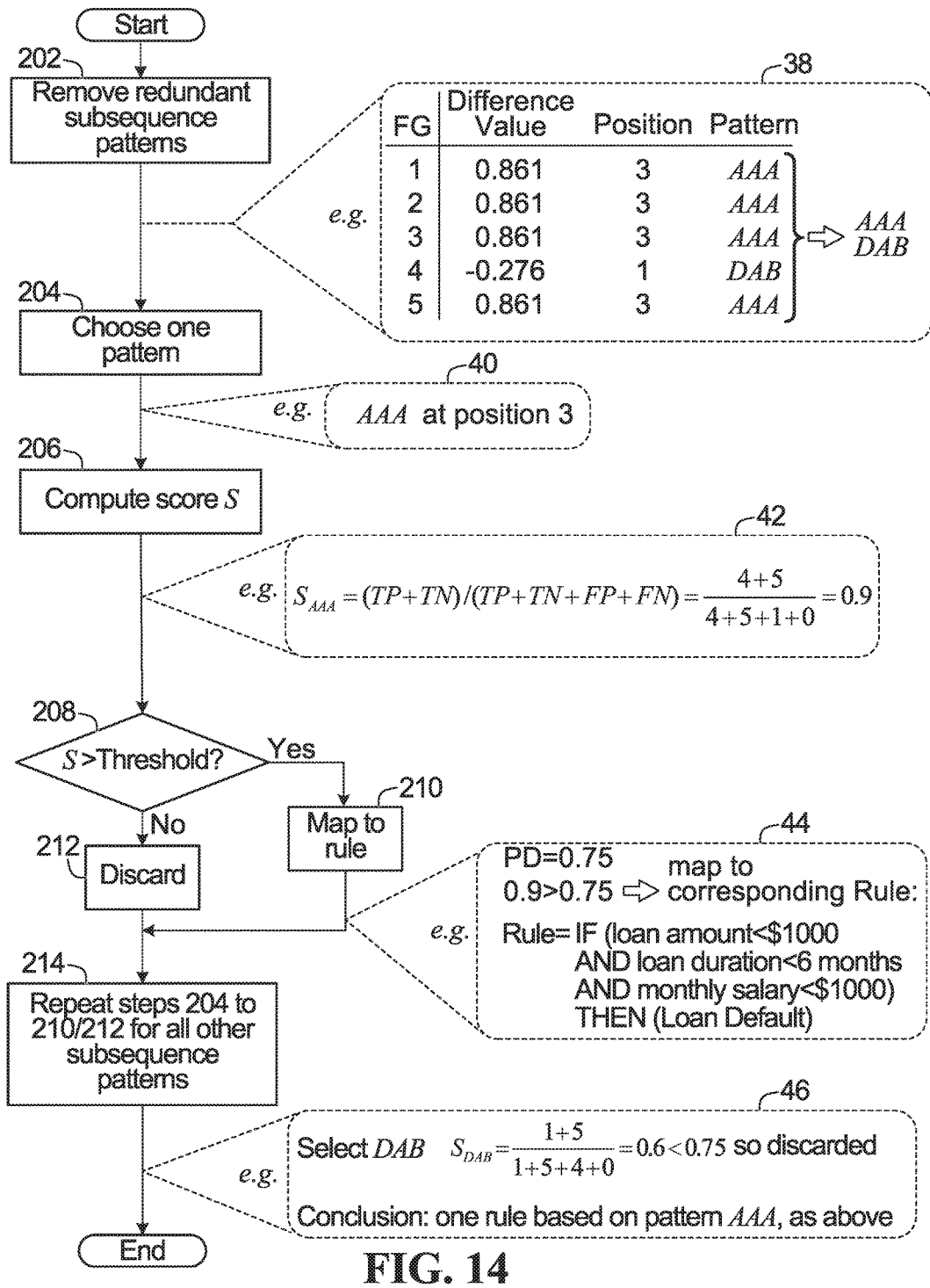
FIG. 14 is a flowchart of operations performed by the rule generator according to one embodiment.

FIG. 14 is a flowchart of operations performed by the rule generator 114 according to one embodiment. FIG. 14 also illustrates, in stippled line bubbles, an example of each operation. In this example, the position table from bubble 36 of FIG. 13B is used.

In step 202, redundant subsequence patterns in the group of subsequence patterns are removed to result in a list of remaining subsequence patterns. In this example, and as shown in bubble 38, the remaining subsequence patterns are: AAA, with associated starting position 3; and DAB, with associated starting position 1.

The remaining subsequence patterns will be denoted using the notation $m_{K,j}^l$, where l denotes a particular remaining subsequence pattern, j is the starting position associated with that remaining subsequence pattern, and K is the subsequence pattern length. In this example, there are two remaining subsequence patterns: $m_{K,j}^1 = m_{3,3}^1$=AAA and $m_{K,j}^2 = m_{3,1}^2$=DAB.

In step 204, one of the subsequence patterns $m_{K,j}^l$ is chosen. In this example, pattern $m_{3,3}^1$=AAA is chosen, as in bubble 40. In step 206, a score $S_{m_{K,j}^l}$ for the chosen subsequence pattern is computed. The score provides a way to determine whether the selected subsequence pattern $m_{K,j}^l$ should be translated into an associated rule, and the score may be computed based on one or more of the following: (1) the number of times the subsequence pattern $m_{K,j}^l$ is present in the foreground sequences, which will be referred to as the true positives (TP); (2) the number of times the subsequence pattern $m_{K,j}^l$ is not present in the foreground sequences, which will be referred to as the false positives (FP); (3) the number of times the subsequence pattern $m_{K,j}^l$ is not present in the background sequences, which will be referred to as the true negatives (TN); (4) the number of times the subsequence pattern $m_{K,j}^l$ is present in the background sequences, which will be referred to as the false negatives (FN). For example, one way to compute the score $S_{m_{K,j}^l}$ is:

$$S_{m_{K,j}^l} = \frac{TP + TN}{TP + TN + FP + FN}.$$

In this example, for subsequence pattern AAA: (1) TP=4 because in the foreground sequences, and beginning at position 3, the subsequence pattern AAA is present four times; (2) TN=5 because in the background sequences, and beginning at position 3, the subsequence pattern AAA is never present; (3) FP=1 because in the foreground sequences, and beginning at position 3, the subsequence pattern AAA is not present only once; and (4) TN=0 because in the background sequences, and beginning at position 3, the subsequence pattern AAA is never present. Using the score computation outlined above $$S_{AAA} = \frac{TP + TN}{TP + TN + FP + FN} = \frac{4 + 5}{4 + 5 + 1 + 0} = 0.9,$$

as shown in bubble 42.

In step 208, a score is compared to a threshold value. The threshold value is a predetermined value meant to ensure that the rule generator 110 only moves forward with subsequence patterns having a sufficiently strong score. The threshold therefore acts as a predefined confidence value to ensure a minimum level of confidence in the subsequence patterns that are actually mapped to rules. The threshold may be programmed into the computer 102.

In step 208, if the score $S_{m_{K,j}^l}$ passes the threshold, then the subsequence pattern is mapped to a corresponding rule in step 210. Otherwise, the subsequence pattern is discarded at step 212.

For this example, the threshold is set as 0.75, and the score $S_{AAA}$ of selected subsequence pattern AAA is 0.9. Because 0.9>0.75, then the subsequence pattern AAA is mapped to the corresponding rule. Recall that subsequence pattern AAA represents: "categorized feature value A for position 3 in the foreground sequences" AND "categorized value A for position 4 of the foreground sequences" AND "categorized feature value A for position 5 of the foreground sequences". As per bubble 16 in FIG. 4: position 3 of the foreground sequences corresponds to feature V, and categorized feature value A in feature V is "loan amount <$1000"; position 4 of the foreground sequences corresponds to feature W, and categorized feature value A in feature W is: "loan duration <6 months"; and position 5 of the foreground sequences corresponds to feature X, and categorized feature value A of feature X is: "monthly salary <$1000". The foreground sequences are the cases in which loan default occurs. Therefore, as shown in bubble 44 of FIG. 14, the extracted rule is: IF loan amount <$1000 AND loan duration <6 months AND monthly salary <$1000, THEN loan default.

In step 214, the operations in steps 204 to 210/212 are repeated for the other remaining subsequence patterns. In this example, there is one other remaining subsequence pattern: DAB. As shown in bubble 46, $$S_{DAB} = \frac{TP + TN}{TP + TN + FP + FN} = \frac{1 + 5}{1 + 5 + 4 + 0} = 0.6.$$

The score $S_{DAB}$=0.6 is less than the threshold 0.75, and so this pattern is discarded.

Other Variations and Alternative Embodiments

The operation of the rule extractor 108 is not limited to generating rules relating to whether or not a loan default will occur. The rule extractor 108 has applicability to any data processed by a binary classifier, regardless of what the binary classifier is classifying. In the banking industry, another application may be a binary classifier to predict whether fraud is occurring, in which case the data 116 would relate to instances of whether or not fraud occurred. The rule extractor 108 may then generate rules relating to when fraud is or is not detected.

In the example operation of the rule extractor 108 described above, rules are only generated for a subsequence pattern length K=3. FIGS. 13A, 13B, and 14 may be repeated with other subsequence pattern lengths, or perhaps all subsequence pattern lengths 1≤K≤L. The computations for different pattern lengths may be performed in parallel. For the boundary case in which K=L, the subsequence pattern is equal to the removed foreground sequence pattern. Also, the boundary case of K=1 is possible, but typically K≥2 in actual implementation so that a subsequence pattern length of at least two feature values is used.

The foreground sequence removed at step 174 of FIG. 13A may be randomly chosen. In such a case, when step 174 is repeated, as per step 188, the foreground sequences previously selected to be removed may be tracked to ensure that all foreground sequences are removed, and none are removed more than once. The foreground sequences may be removed in any order.

At step 176 of FIG. 13A, the first subsequence pattern of length K is selected that begins at position 1 of the removed foreground sequence, and then at step 184 the operations are repeated for the next L−K positions of the removed foreground sequence. Alternatively, the order in which the subsequence patterns are chosen may be changed.

In the operation of the pattern selector 112 described in relation to FIGS. 13A and 13B, the subsequence patterns always used the respective feature values from the removed foreground sequence. However, more generally, the subsequence pattern selected each time may only include some of the actual respective feature values from the removed foreground sequence, with the others being treated as unknown. For example, in bubble 22 of FIG. 13A foreground sequence 5 is removed, which has associated subsequence pattern BBAAA, and in bubble 24 the subsequence pattern of length 3 beginning at position 1 is selected: BBA. However, instead the subsequence pattern selected may be B ** or BB * or B * A or * BA or ** A or * B *, where * is used to indicate that the position can take on any feature value. The * position is assigned a probability of occurrence in the foreground sequences of 1/Σ, where Σ is the alphabet size. i.e., the number of categorized feature values. Thus, the probability would be equal for each feature. Having one or more spots in the subsequence patterns in which the associated feature values are treated as unknown may accommodate situations in which there is no feature reordering, i.e., no step 154 in FIG. 4. For example, if for a removed foreground sequence the subsequence pattern is ABC, subsequence pattern A*C may instead be used so that features A and C are treated like adjacent neighbours, even though these features were not reordered to actually be at adjacent positions.

At step 206 of FIG. 14 the score is computed using the example formula $$S = \frac{TP + TN}{TP + TN + FP + FN}.$$

Examples of other ways the score may be computed are:

$$= \frac{FP + FN}{TP + TN + FP + FN}; S = \frac{TP}{FN + TP};$$
$$S = \frac{TP}{FP + TP}; S = \frac{TN}{TN + FP}; \text{ and } S = \frac{TN}{TN + FN}.$$

For each way the score is computed, a respective threshold for step 208 of FIG. 14 would need to be determined. Given the different ways the score may be computed, the comparison to the threshold in step 208 of FIG. 14 may not be "greater than" (>). In any case, whether the score is above or below the threshold controls whether the score passes the threshold and therefore whether the subsequence pattern is mapped to the subsequence pattern's corresponding rule or discarded.

An LLR may be computed in step 182 of FIG. 13B. More generally, the value computed in step 182 may use any formula that provides a difference measurement, i.e. a measurement of the occurrence of the subsequence pattern in the remaining foreground sequences compared to the occurrence of the subsequence pattern in the background sequences, and depending on the measurement used, the previous steps in FIGS. 13A and 13B may need to be modified. The LLR is one example of a measurement of the occurrence of the subsequence pattern in the remaining foreground sequences compared to the occurrence of the subsequence pattern in the background sequences, but others are possible, some of which do not even require the computation of probabilities. For example, in step 178 the pattern selector 112 may count the number of times the selected subsequence pattern was present in the foreground sequences, and in step 180 the pattern selector 112 may count the number of times the selected subsequence pattern was present in the background sequences. Then, the LLR of these two values, or another ratio of these two values, or the subtraction of these two values, or the like, may be computed in step 182. However, by using probabilities, as described above in relation to 178 to 182, statistically significant different sequences in the foreground sequences compared to the background sequences may be identified. In the loan default scenario, this means that statistically significant different loan default signals compared to the non-default groups may be identified.

In the embodiments above, the rule extractor 108 identifies the over-represented patterns, that is, the patterns that are well represented in the foreground sequences but not that well represented in the background sequences. This is consistent with step 186 in FIG. 13B in which the largest difference value is being chosen. For LLR, and when the ratio is probability of occurrence in foreground sequences divided by probability of occurrence in background sequences, then a positive LLR value having a large magnitude may be said to correspond to an over-represented pattern. The corresponding rule may be said to be a majority rule. Optionally, the rule extractor 108 may additionally or instead identify under-represented patterns, that is, the patterns that are well represented in the background sequences but not that well represented in the foreground sequences. A negative LLR value having a large magnitude may be said to correspond to an under-represented pattern. The corresponding rule may be said to be a minority rule. In the context of a loan application scenario, the minority rules provide insight into factors that contributed to the binary classifier's decision to predict that loan default would not occur.

Steps 188 and/or 214 may be omitted in some implementations, although in such a case the rule extractor 108 may miss extracting some rules that provide insight into the combination of features that influence the decision of the binary classifier 106.

The data 116 stored in memory 104 need not necessarily be used to train the binary classifier 106. Alternatively, the data 116 may be actual samples the binary classifier 106 previously processed, along with the associated event outcomes (YES or NO) that were output from the binary classifier 106. In such a case, the rules extracted by the rule extractor 108 would be rules from the output of the predicted models implemented by the binary classifier 106.

Possible benefits of the rule extractor 108 include: independence of the underlying classifiers, i.e., it does not matter what machine learning algorithm or algorithms the binary classifier 106 implements; the ability to have an implementation in which under-represented patterns and associated minority rules are detected; and the ability to possibly identify less-frequent but highly distinguishable rules.

Example General Method

Figure 15:
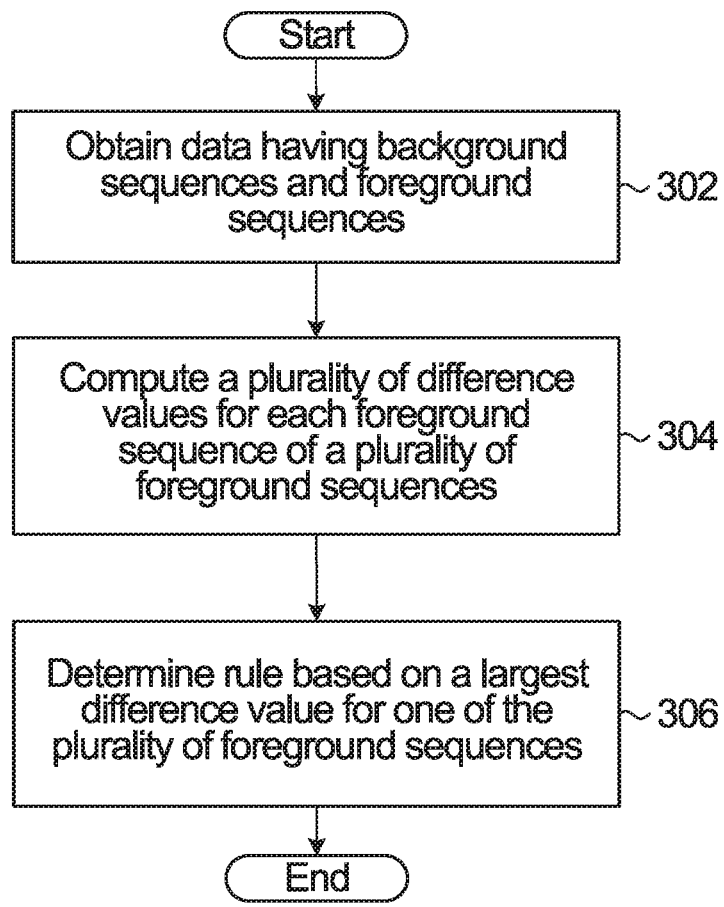
FIG. 15 is a flowchart of operations performed by a computer to generate a rule according to one embodiment.

FIG. 15 is a flowchart of operations performed by a computer to generate a rule according to one embodiment. The method operates in conjunction with machine learning binary classification of an event, and the rule relates to whether or not the event will occur.

In step 302, the computer obtains a set of data having background sequences and foreground sequences. Each of the background sequences and the foreground sequences has L sequence positions, and each of the L sequence positions of each sequence has a respective feature value. The feature value may be a categorized feature value. Each sequence in the foreground sequences corresponds to an instance of the event happening, and each sequence in the background sequences corresponds to an instance of the event not happening.

In step 304, for each foreground sequence of a plurality of the foreground sequences, the computer computes a plurality of difference values. In one embodiment, the plurality of difference values are computed as follows: for each difference value the computer obtains a respective subsequence pattern comprising feature values in a respective set of positions of the selected foreground sequence, and the computer computes a value representing a comparison of: (i) occurrence of the respective subsequence pattern in the other foreground sequences and (ii) occurrence of the respective subsequence pattern in the background sequences, to obtain the difference value.

In step 306, the computer determines the rule based on a largest difference value for one of the plurality of foreground sequences.

In some embodiments, the computer performs steps 304 and 306 for a particular value K, where K≤L, and where K is the length of each respective subsequence pattern obtained in step 304. In some embodiments, there are N foreground sequences obtained in step 302, in which case the "other foreground sequences" mentioned in step 304 refers to the N−1 foreground sequences different from the selected one foreground sequence.

When the computer performs step 304, the respective subsequence pattern corresponding to each difference value may be different from the respective subsequence pattern corresponding to each other difference value. Also, step 304 may be performed for L−K+1 difference values, e.g., as in steps 182 and 184 of the FIG. 13B embodiment.

Computing the value representing the comparison may comprise: computing a first probability that the respective subsequence pattern is present in the other foreground sequences; computing a second probability that the respective subsequence pattern is present in the background sequences; and determining the value representing the comparison using the first probability and the second probability. Determining the value representing the comparison using the first probability and the second probability may comprise computing a ratio of the first probability and the second probability. For example, an LLR may be computed, as in the example in bubble 30 of FIG. 13B.

Obtaining the rule may comprise mapping the respective subsequence pattern corresponding to the largest difference value to the rule. As another example, obtaining the rule may comprise: (a) computing a score based on at least one of: (i) how often the respective subsequence pattern corresponding to the largest difference value is present in the foreground sequences, and (ii) how often the same respective subsequence pattern corresponding to the largest difference value is present in the background sequences; (b) comparing the score to a threshold; and (c) mapping the respective subsequence pattern corresponding to the largest difference value to the rule when the score passes the threshold.

The plurality of sequences in step 304 may be all N foreground sequences obtained in step 302.

The method may further comprise obtaining a subsequence pattern corresponding to another largest difference value of another one of the plurality of foreground sequences, and obtaining another rule from the subsequence pattern corresponding to the other largest difference value.

Steps 304 and 306 may be repeated using subsequence patterns of a different length, e.g. steps 304 and 306 may be repeated for each of a plurality of other values of K≤L.

Obtaining the set of data in step 302 may comprise retrieving from memory original data that comprises a plurality of samples. The original data may be the data 116 from the FIG. 1 embodiment. In any case, each sample corresponds to an instance of the event either occurring or not occurring, and each sample has a plurality of features, each one of the plurality of features taking on one of a plurality of values. For each sample in the original data: a value of a feature may be mapped to another feature value of a finite number of categorized feature values. The samples may be partitioned into the foreground sequences and the background sequences to result in the set of data. Each sample can be designated as either: (i) a foreground sequence if the sample corresponds to an instance of the event occurring, or (ii) a background sequence if the sample corresponds to an instance of the event not occurring. Prior to partitioning the samples into the foreground sequences and the background sequences, the location of one or more features in each of the samples may be reordered. An example of this is step 154 of FIG. 4. In some embodiments, at least one of: (i) the original data is also processed by the machine learning binary classification, and (ii) the original data is from an output of the machine learning binary classification.

The rule may be an if-then rule, but more generally does not need to be. For example, the rule may amount to a list of categorized feature values that influence whether or not the event occurs. As per the example described earlier, the event may be loan default, and the rule may be an if-then rule specifying an if-then condition relating to whether or not loan default will occur.

When performing the method of FIG. 15, a position table may be initialized with N entries. Each entry represents a potential start position of a respective subsequence pattern in a foreground sequence. As the plurality of particular difference values are computed, the values in the position table may be updated. An example of a position table is illustrated in bubble 36 of FIG. 13B.

The methods described above may be performed by a system. The system may comprise a computer, such as the computer 102. In some embodiments, the computer may have a processor, a memory, and instructions stored on the memory that, when executed, cause the computer to perform the operations in FIG. 15.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A computer-implemented method that operates in conjunction with machine learning binary classification, the method for generating a rule relating to whether or not loan default will occur, the method comprising:
receiving original data originating from a plurality of loan applications, the original data including for each loan application of the plurality of loan applications: an income of a loan applicant, a requested loan duration, and a requested loan amount;
training a machine learning binary classifier using the original data to obtain a trained machine learning binary classifier that predicts whether loan default will occur;
additionally determining, by the computer, a set of data from the original data, the set of data having background sequences corresponding to instances of the loan default not occurring and foreground sequences corresponding to instances of the loan default occurring, each sequence position of each of the background sequences and each sequence position of each of the foreground sequences having a respective feature value, wherein a feature value is an input factor that influences whether or not the loan default occurs;
for each selected foreground sequence of a plurality of the foreground sequences, computing, by the computer, a plurality of difference values by, for each difference value:
obtaining a respective subsequence pattern comprising K feature values in a respective set of K positions of the selected foreground sequence, wherein K is at least one and no greater than a length of the selected foreground sequence; and
obtaining the difference value by computing a ratio of: (i) a first probability that the respective subsequence pattern is present in other foreground sequences, the other foreground sequences being different from the selected foreground sequence; and (ii) a second probability that the respective subsequence pattern is present in the background sequences, wherein the second probability is computed by multiplying together K probability values, each one of the K probability values corresponding to a different respective position of the K positions of the selected foreground sequence, and each one of the K probability values equal to a probability that the feature value at the respective position in the selected foreground sequence is located at the respective position in the background sequences, and wherein the probability that the feature value at the respective position in the selected foreground sequence is located at the respective position in the background sequences is obtained based on a frequency of how often the feature value is present at the respective position in the background sequences;
determining, by the computer, the rule based on a largest difference value for one of the plurality of foreground sequences, wherein the rule is a representation of one or more factors that contribute to a decision of the trained machine learning binary classifier;
transmitting information from the rule for presentation at a user interface in order to supplement an output from the trained machine learning binary classifier.

2. The computer-implemented method of claim 1, wherein obtaining the rule comprises:
computing a score based on at least one of: (i) how often the respective subsequence pattern corresponding to the largest difference value is present in the foreground sequences, and (ii) how often the respective subsequence pattern corresponding to the largest difference value is present in the background sequences;
comparing the score to a threshold;
mapping the respective subsequence pattern corresponding to the largest difference value to the rule when the score passes the threshold.

3. The computer-implemented method of claim 1, wherein the plurality of the foreground sequences is all of the foreground sequences.

4. The computer-implemented method of claim 1, wherein computing a plurality of difference values for each selected foreground sequence of a plurality of the foreground sequences and determining the rule is repeated using subsequence patterns of a different length.

5. The computer-implemented method of claim 1,
wherein the original data comprises a plurality of samples, each sample corresponding to an instance of the loan default either occurring or not occurring, and each sample having a plurality of features, each one of the plurality of features taking on one of a plurality of values;
the method further comprising:
for each sample in the original data: mapping a value of a feature to another feature value of a finite number of categorized feature values;
partitioning the samples into the foreground sequences and the background sequences to result in the set of data, wherein each sample is designated as either: (i) a foreground sequence if the sample corresponds to an instance of the loan default occurring, or (ii) a background sequence if the sample corresponds to an instance of the loan default not occurring.

6. The computer-implemented method of claim 1, wherein the rule is an if-then rule specifying an if-then condition relating to at least one of: whether loan default will occur and whether loan default will not occur.

7. The method of claim 1, wherein a weight matrix storing a frequency of each feature value at each of one or more positions of the background sequences is used when computing the second probability that the respective subsequence pattern is present in the background sequences.

8. A system to operate in conjunction with machine learning binary classification, the system to generate a rule relating to whether or not loan default will occur, the system comprising:
a memory to store original data originating from a plurality of loan applications, the original data including for each loan application of the plurality of loan applications: an income of a loan applicant, a requested loan duration, and a requested loan amount;
a processor to train a machine learning binary classifier using the original data to obtain a trained machine learning binary classifier that predicts whether loan default will occur;
a rule extractor to determine a set of data from the original data, the set of data having background sequences corresponding to instances of the loan default not occurring and foreground sequences corresponding to instances of the loan default occurring, each sequence position of each of the background sequences and each sequence position of each of the foreground sequences having a respective feature value, wherein a feature value is an input factor that influences whether or not the loan default occurs;

the rule extractor further to:

for each selected foreground sequence of a plurality of the foreground sequences, compute a plurality of difference values by, for each difference value:

obtaining a respective subsequence pattern comprising K feature values in a respective set of K positions of the selected foreground sequence, wherein K is at least one and no greater than a length of the selected foreground sequence; and obtaining the difference value by computing a ratio of: (i) a first probability that the respective subsequence pattern is present in other foreground sequences, the other foreground sequences being different from the selected foreground sequence; and (ii) a second probability that the respective subsequence pattern is present in the background sequences, wherein the second probability is computed by multiplying together K probability values, each one of the K probability values corresponding to a different respective position of the K positions of the selected foreground sequence, and each one of the K probability values equal to a probability that the feature value at the respective position in the selected foreground sequence is located at the respective position in the background sequences, and wherein the probability that the feature value at the respective position in the selected foreground sequence is located at the respective position in the background sequences is obtained based on a frequency of how often the feature value is present at the respective position in the background sequences;

determine the rule based on a largest difference value for one of the plurality of foreground sequences, wherein the rule is a representation of one or more factors that contribute to a decision of the trained machine learning binary classifier;

transmit information from the rule for presentation at a user interface in order to supplement an output from the trained machine learning binary classifier.

9. The system of claim 8, wherein the rule extractor is to obtain the rule by:

computing a score based on at least one of: (i) how often the respective subsequence pattern corresponding to the largest difference value is present in the foreground sequences, and (ii) how often the respective subsequence pattern corresponding to the largest difference value is present in the background sequences;

comparing the score to a threshold;

mapping the respective subsequence pattern corresponding to the largest difference value to the rule when the score passes the threshold.

10. The system of claim 8, wherein the plurality of the foreground sequences is all of the foreground sequences.

11. The system of claim 8, wherein the rule extractor is to repeat computing a plurality of difference values for each selected foreground sequence of a plurality of the foreground sequences and repeat determining the rule, using subsequence patterns of a different length.

12. The system of claim 8, wherein the original data comprises a plurality of samples, each sample corresponding to an instance of the loan default either occurring or not occurring, and each sample having a plurality of features, each one of the plurality of features taking on one of a plurality of values;

wherein the system is to generate the set of data by:

for each sample in the original data: mapping a value of a feature to another feature value of a finite number of categorized feature values;

partitioning the samples into the foreground sequences and the background sequences to result in the set of data, wherein each sample is designated as either: (i) a foreground sequence if the sample corresponds to an instance of the loan default occurring, or (ii) a background sequence if the sample corresponds to an instance of the loan default not occurring.

13. The system of claim 8, wherein the memory is to store the rule for presentation of the rule to a user.

14. The system of claim 8, wherein the rule is an if-then rule specifying an if-then condition relating to at least one of: whether loan default will occur and whether loan default will not occur.

15. The system of claim 8, wherein a weight matrix storing a frequency of each feature value at each of one or more positions of the background sequences is used when computing the second probability that the respective subsequence pattern is present in the background sequences.

* * * * *